US 8,166,416 B2
Mei et al.
(45) Date of Patent: Apr. 24, 2012

(54) PLAY MENU AND GROUP AUTO ORGANIZER SYSTEM AND METHOD FOR A MULTIMEDIA PLAYER

(75) Inventors: David Mei, Forest Hills, NY (US); Jin-Xia Bao, Forest Hills, NY (US); Si Ping Bao, Forest Hills, NY (US)

(73) Assignee: Cyber Group USA, Inc., Forest Hills, NY (US)

( * ) Notice: Subject to any disclaimer, the term of this patent is extended or adjusted under 35 U.S.C. 154(b) by 1658 days.

(21) Appl. No.: 11/502,143

(22) Filed: Aug. 10, 2006

(65) Prior Publication Data

US 2008/0080837 A1 Apr. 3, 2008

Related U.S. Application Data

(60) Provisional application No. 60/709,024, filed on Aug. 17, 2005, provisional application No. 60/754,860, filed on Dec. 29, 2005.

(51) Int. Cl.
*G06F 3/048* (2006.01)
*G06F 3/00* (2006.01)

(52) U.S. Cl. ........ 715/786; 715/787; 715/720; 715/721; 715/973; 715/974

(58) Field of Classification Search .................. 715/781, 715/784, 716–733, 786, 787, 973, 974, 978; 345/173
See application file for complete search history.

(56) References Cited

U.S. PATENT DOCUMENTS

| | | | | |
|---|---|---|---|---|
| 6,587,127 | B1 * | 7/2003 | Leeke et al. | 715/765 |
| 6,731,312 | B2 * | 5/2004 | Robbin | 715/792 |
| 6,809,722 | B2 | 10/2004 | Mei et al. | |
| 6,928,433 | B2 | 8/2005 | Goodman et al. | |
| 6,987,221 | B2 | 1/2006 | Platt | |
| 7,680,824 | B2 * | 3/2010 | Plastina et al. | 707/737 |
| 2002/0026512 | A1 * | 2/2002 | Nishimura et al. | 709/226 |
| 2003/0020671 | A1 * | 1/2003 | Santoro et al. | 345/1.3 |
| 2003/0079234 | A1 * | 4/2003 | Rasmussen | 725/153 |
| 2003/0182315 | A1 * | 9/2003 | Plastina et al. | 707/200 |
| 2004/0055446 | A1 * | 3/2004 | Robbin et al. | 84/615 |
| 2004/0078382 | A1 * | 4/2004 | Mercer et al. | 707/102 |
| 2006/0195516 | A1 * | 8/2006 | Beaupre | 709/203 |
| 2006/0195790 | A1 * | 8/2006 | Beaupre et al. | 715/727 |

* cited by examiner

*Primary Examiner* — Tadeese Hailu
(74) *Attorney, Agent, or Firm* — Collard & Roe, P.C.

(57) ABSTRACT

A multimedia play menu is generated into an auto playgroup organizer system for a multimedia player by using intelligence cursor/scroll sequence functions programmed for operation by an input device such as a hand-held mobile mouse. The intelligence cursor/scroll can sense any type of digitalized item or symbol displayed on the LED or LCD screen of the multimedia player. When the intelligence cursor/scroll function senses a click/press sequence symbol representing the position of a song, it will start to carry out a click/press sequence function as a user wishes. The more clicks/presses are applied by the intelligence cursor/scroll on the sequence symbol before a song/item, the higher the position for that song/item is created, analyzed, recorded and carried out.

15 Claims, 14 Drawing Sheets

FIG. 13

PLAY MENU AND GROUP AUTO ORGANIZER SYSTEM AND METHOD FOR A MULTIMEDIA PLAYER

CROSS REFERENCE TO RELATED APPLICATIONS

Applicants claim priority under 35 U.S.C. §119(e)(i) and the benefit of copending U.S. Provisional Application Ser. No. 60/709,024, entitled "Method and Apparatus for Play Menu and Group Auto Organizer of a Multimedia Player," filed Aug. 17, 2005, and 60/754,860, entitled "Method and Apparatus for Play Menu and Group Auto Organizer of a Multimedia Player," filed Dec. 29, 2005, which are incorporated by reference herein.

BACKGROUND OF THE INVENTION

1. Field of the Invention

The present invention relates to system and methods for play list generation and more particularly to a method and system for facilitating selection of at least one media item from a plurality of media items.

2. The Prior Art

Digitalized multimedia players are becoming more popular in today's market just as compact disc (CD) players became popular in the 1980s. The dimensions of such multimedia players are becoming smaller and smaller so as to be a hand held palm size, and the contents of such players are becoming bigger and bigger so as to be capable of storage of 1,000 or 2,000 songs, for example. Unlike a personal CD player that plays only one CD at a time, multimedia players have the contents of hundreds or more CDs mixed together. This capability leads to at least two problems. Problem One: it is difficult for a user of a multimedia player to organize, arrange or prioritize all files, audios, videos or other media items into a selected sequence that the user wants the media item to play in. Problem Two: it is difficult for a user of a multimedia player to move or scroll (in an X-axis or Y-axis direction) the contents displayed on the relatively tiny screen of a mini multimedia player in the way he or she wants to organize the media items for playing.

As many multimedia players still follow the steps of traditional personal CD players, there have begun efforts to organized those collections of songs or other media items in multimedia players. Many multimedia players are alternatively assisted using a personal computer (PC), a notebook computer or some other external digital device to organize or arrange all songs/items downloaded from an external source or from internal storage.

U.S. Pat. No. 6,928,433 to Goodman et al. shows one of the more recent patented methods of automatic hierarchical categorization of music in a multimedia player. This method automatically files tracks according to a hierarchical structure of categories to organize tracks in a logical order. This method, however, is difficult for a user to use to organize songs in the way he or she likes because the method automatically files tracks in a hierarchical order based on attributes of the tracks. The method also is difficult because it requires a user to go through many steps. For example, the method requires the steps of displaying categories on the display, accepting signals from a user's input control to select a category, displaying one or more songs in the selected category on the display, accepting signals from a user's input control to select a displayed song, and entering selected songs into a playlist queue, wherein the device plays back songs in the playlist queue. Generally speaking, because the display screen is very small (1"×2" or 1.5"×1.5" usually) and the input controls very limited, a user will get confused with so many required steps to generate a playlist in the way he or she likes to play. Many times, people want to play music in a multimedia player not only in a hierarchical way based on attributes of the tracks, but also in a free, open, easy, comfortable, and mixable way.

U.S. Pat. No. 6,987,221 to Platt discloses another method of facilitating generation of playlist and organization and access to media items by identifying items similar to desirable characteristics and dissimilar to undesirable characteristics by analyzing user selectable seed items. In other words, this method facilitates playlist generation for a library or collection of media items by permitting a user to select a plurality of seed items. This method compares media items in the collection with the seed items and determines which media items are to be added to the playlist. This method has the problem that it is difficult for a user to set up or define a desirable seed item or undesirable seed item with respect to hundreds or thousands of songs or media items in a multimedia player with a large storage space. If the seed item is not defined correctly or accurately, the entire playlist based on that seed item will be totally or at least partially wrong, causing frustration for the user and wasting his or her time.

U.S. Patent Application Publication No. 2004/0055446 to Robbin et al. discloses a method for providing user-supplied configuration data in a hierarchically-ordered graphical user interface. A first order interface provides a highest order of user-selectable items, each of which, when selected, results in an automatic transition to a lower order user interface associated with the selected item. The selection of each interface, however, lacks the capacity to organize multiple tasks to a user's various needs, especially for multiple selections of a large number of songs and items with mixed categories at any time or in a variety of situations. From another aspect, using many interfaces is too complicated to complete multiple selections of the many songs, artists and categories presented by multimedia players.

Therefore, for many reasons, there is a need for a method and a system that provides a new, easy, open, free, comfortable, and mixable music play arrangement that provides intelligence cursor/scroll sequence organizing functions.

SUMMARY OF THE INVENTION

The present invention provides an easier and more efficient system and method to organize songs/items in a mini-sized multimedia player.

In one aspect, a method is provided of facilitating selection of at least one media item from a plurality of media items stored in a source unit for operation by a portable media player in response to signals generated by an input device. In accordance with the method, a multimedia play menu is generated for display on a screen of the media player. The menu includes a list of media items to be operated by the media player, and each media item has an associated sequence symbol. The media items are organized into a selected operation sequence based on signals generated by the input device in response to the number of times a respective sequence symbol is selected by the input device.

The media item or items is preferably in digital form and may be a single song, an album of songs, a group of albums of songs, a set of electronic books, a set of images, a photo, a recorded telephone call, an audio file, a video file, or a script file.

Selection by the input device of a respective sequence symbol may be carried out via a click signal generated by the input device to activate a computer programmed click function operation in a central processing unit.

The selected operation sequence may be stored as a first play group in a storage unit of the media player. At least one additional play group including a selected operation sequence of media items may be stored in the storage unit. A new play group may be generated based on media items selected from media items contained in the play groups stored in the storage unit.

A new operation sequence may be generated or the selected operation sequence may be added to or changed, preferably at any time or situation while a media item is operating or playing. For example, the media item may be caused to operate and while the media item is operating, the selected operating sequence may be modified by selecting one or more media items by the input device to change the priority. The modified selected operation sequence maybe saved in a storage unit of the media player.

A first interface may be displayed having a list of user selectable items on the multimedia play menu. In response to selection of one of the user selectable items, a second interface may be displayed containing the list of items to be operated by the media player.

A first interface may be displayed having a first list of user selectable items on the multimedia play menu, a second interface may be displayed having a second list of user selectable items on the multimedia play menu, and sub-lists may be generated that are associated with the user selectable items on the second list. In response to selection of the user selectable item on the second list, a sub-list associated with the user selectable item may be displayed.

The input device may include an intelligence scroll sequence function bar, a scroll arrow device and a press device. The scroll arrow device controls movements of the intelligence scroll sequence function bar, The intelligence scroll sequence function bar has a computer programmed press command function controlled by the press device and a computer programmed screen scroll moving function and a computer programmed screen scrolling function. The computer programmed screen scroll moving or screen scrolling functions are activated in response to movements of the intelligence scroll sequence function bar. Application of the intelligence scroll sequence bar to a sequence symbol changes a priority operation sequence value associated with the media item relative to other items in the list of media items.

The scroll arrow device and the press device may be programmed to cause activation of a recording function, a go back to a front or start end of a media item function, a reverse function, a stop function, a forward function, a go forward to a rear end of a media item function, a pause function, a save function for saving a file or a group into the storage unit, and a delete function for deleting a file or a group from the storage unit.

In another aspect, a system is provided for facilitating selection of at least one media item from a plurality of media items. The system includes an input unit, a source unit accessible by the input unit for storage of media items, and a central processing unit for operating and processing computerized programs including input commands of a user through the display device to display computerized results to the user. The input unit includes a housing, a sphere disposed in an upper portion of the housing, and a display device in a front portion of the housing.

The system also includes a play unit, and an output unit. The play unit includes at least one media item and causes generation of the at least one media item in response to commands received from the input user. The output unit causes display of results of commands or contents of media items on the display device.

The display device may include a bordered screen including a plurality of borders and an intelligence cursor responsive to movements of the sphere for generating a signal to activate a computer programmed screen or scroll moving function or a computer programmed cursor movement function for generating cursor motions in "X" axis and "Y" axis directions.

Movement of the intelligence cursor into contact with a border may generate a border moving signal for causing the bordered screen from a first data sets to a second data set.

The bordered screen may include at least two sub-screens with different screen contents.

The bordered screen may include a list of user selectable items, wherein contact by the intelligence cursor with a user selectable item causes display of an associated pop-up butterfly wing style display including a sub-list of user selectable items.

The input device may include an intelligence scroll sequence function bar for causing computer programmed screen scroll moving or screen scrolling functions in response to movements of the intelligence scroll sequence function bar. The movements may be controlled by a scroll arrow device.

The intelligence scroll sequence function bar may be adapted to detect a user selectable command or content item on the display device and be operable to organize media items associated with the user selectable item when the user selectable item is a content item and to carry out computer. programmed functions associated with the user selectable item when the user selectable item is a command item.

As discussed below, the present invention in a first aspect generates a multimedia play menu into an auto playgroup organizer system for a multimedia player by using intelligence cursor/scroll sequence functions programmed for operation by an input device such as a hand-held mobile mouse, a-scroll/press arrow device, or a standard mouse, trackball, arrow discs, keyboard, or other input device. The multimedia player can be a hand-held mini player, a hand-held multi-function mouse, a personal data assistant (PDA), a desktop computer, a computer network, a cellular or satellite communicator, or an internet server.

In a second aspect, the present invention provides an input device in which the intelligence cursor/scroll functions have multiple organizing functions beyond standard mouse cursor/key scroll functions. The intelligence cursor/scroll function can sense the type of the digitalized item or symbol displayed on a light emitting diode (LED) or liquid crystal display (LCD) screen of the multimedia player from a number of types of digitalized items or symbols. When the intelligence cursor/scroll function senses a click/press sequence function symbol representing the position of a song, it will start to carry out the click/press sequence function as a user wishes. The more clicks/presses are applied by the intelligence cursor/scroll function on the sequence symbol before a song/item, the higher the position that is created, analyzed, recorded and carried out for that song. In other words, all songs, albums, play groups or other items in the multimedia player can be automatically and simultaneously organized into a new album/play group or reorganized within an old album or play group at any time in various situations to create a priority arrangement in the old/new album or play group with any kind of multiple cross-over/non-hierarchical combination of one or multiple categories.

The method and system can be designed, systemized, or organized for any type of digitalized audio, video, or script file or section, such as a single song/photo, an album of songs/photos, a group of albums/photos, or any other digitalized item used or operated in the multiple player or other digital device.

An object of the present invention is to provide a multi media player menu organizing system and method that uses intelligence cursor/scroll sequence functions of an input device such as a hand-held mobile mouse, a scroll/press arrow device, a standard mouse/track ball/arrow discs/keyboard device, or other input device.

Another object of the present invention is to provide a method and system that can be used with a multimedia player that is a hand-held mini player, a hand-held multifunction mouse, a personal data assistant (PDA), a desktop computer, a computer network, a cellular/satellite communicator, or an internet server.

Yet another object of the present invention is to provide a method and system that can be used with a wireless hand-held multi function mouse combined with a multimedia player.

Another object of the present invention is to provide a method and system in which an intelligence cursor/scroll has multiple organizing functions beyond standard mouse cursor/key scroll functions.

Yet another object of the present invention is to provide a method and system in which an intelligence cursor/scroll is combined with simultaneous multiple functions, including sensing a click/press sequence function symbol representing the position of a song, and analyzing, recording, and carrying out click/press sequence functions as a user wishes at any time in a variety of situations.

Another object of the present invention is to provide an intelligence cursor/scroll combined with simultaneous multiple functions including sensing a click/press border-moving function symbol to carry out the content movements associated with that function in an X-Y direction as a user wishes at any time and in a variety of situations.

Yet another aspect of the present invention is to provide an intelligence cursor/scroll symbol with a click/press sequence function representing the priority position of a song or item.

Another object of the present invention is to provide an intelligence cursor or scroll symbol with a click or press sequence number inside to represent the priority position of a song or other item.

Yet another object of the present invention is to provide an intelligence cursor and intelligence scroll interchangeable and switchable with each other at any time in a variety of situations to carry out a click or press sequence function representing the priority position of a song or other item.

Another object of the present invention is to provide a multimedia play menu organizing system and method by using an intelligence cursor or scroll sequence function to systemize, classify, or mix all songs or other items by artist name, album name, song name, content type, or chronicle type.

Yet another object of the present invention is to provide a butterfly-styled interface combined with an intelligence cursor or scroll function for more efficient arrangement of the priority position of a song or other item.

Another object of the present invention is to provide a left or a right pop-out sub-menu content of the selected item in the butterfly-styled interface combined with an intelligence cursor or scroll function for more efficient selection and arrangement of the priority position of a song or other item.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

Figure 13:
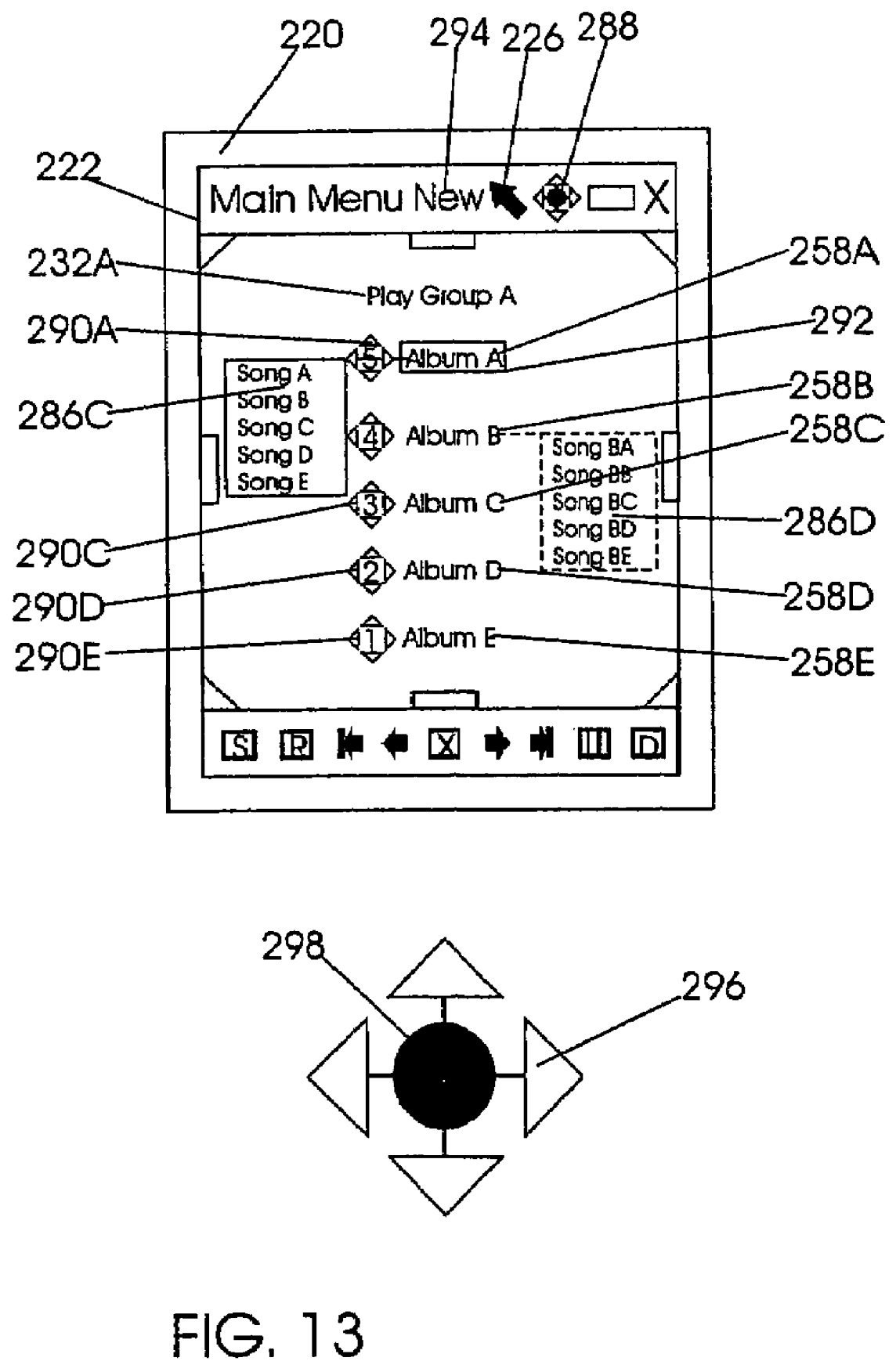

FIG. 13 shows a sixth interface of an auto multimedia player organizer system for a multimedia player in accordance with the invention.

DETAILED DESCRIPTION OF PREFERRED EMBODIMENTS

Figure 1:
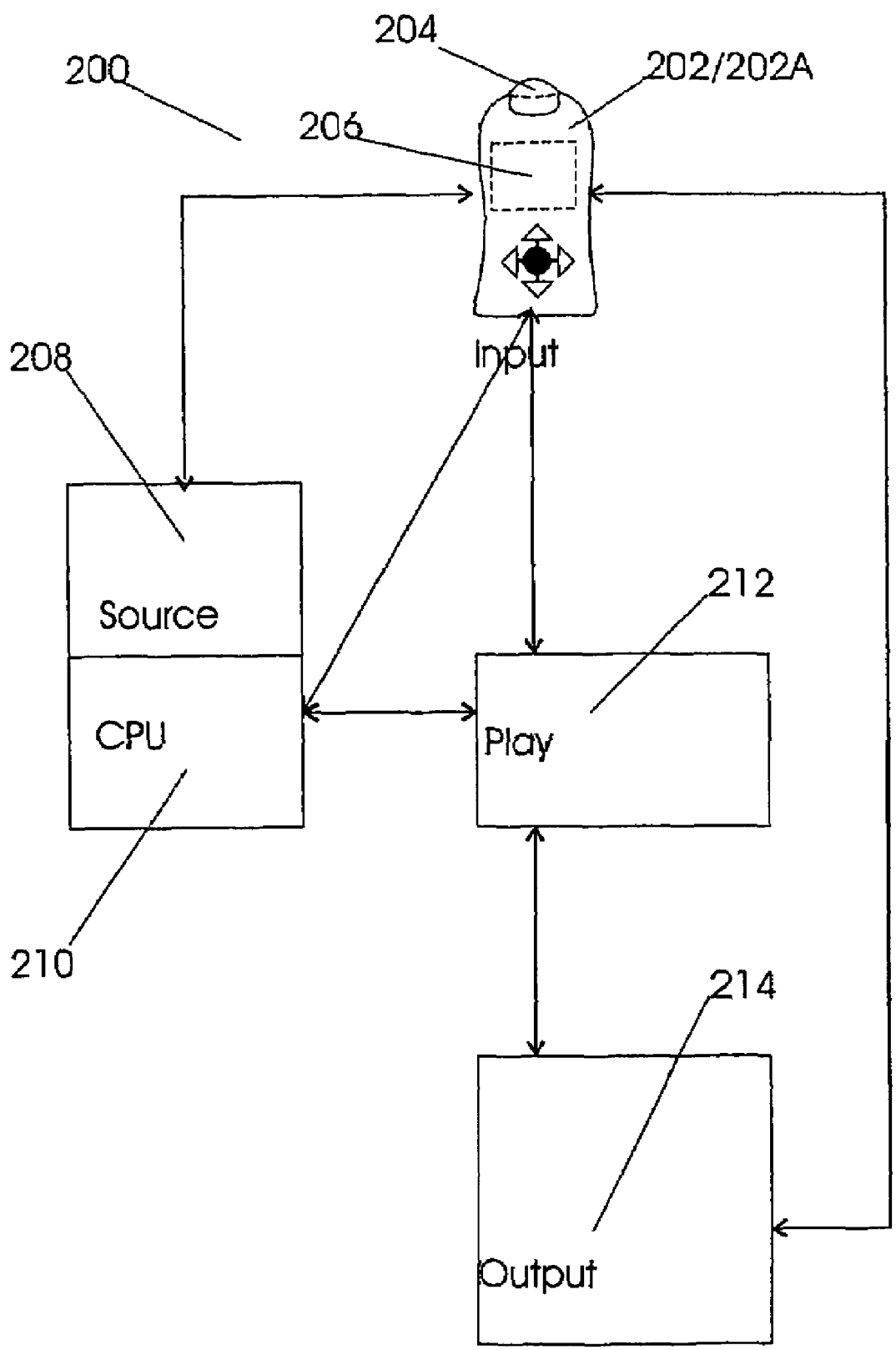
FIG. 1 is a diagram view of an auto multimedia player organizer system for a multimedia player according to an embodiment of the invention.
Figure 2:
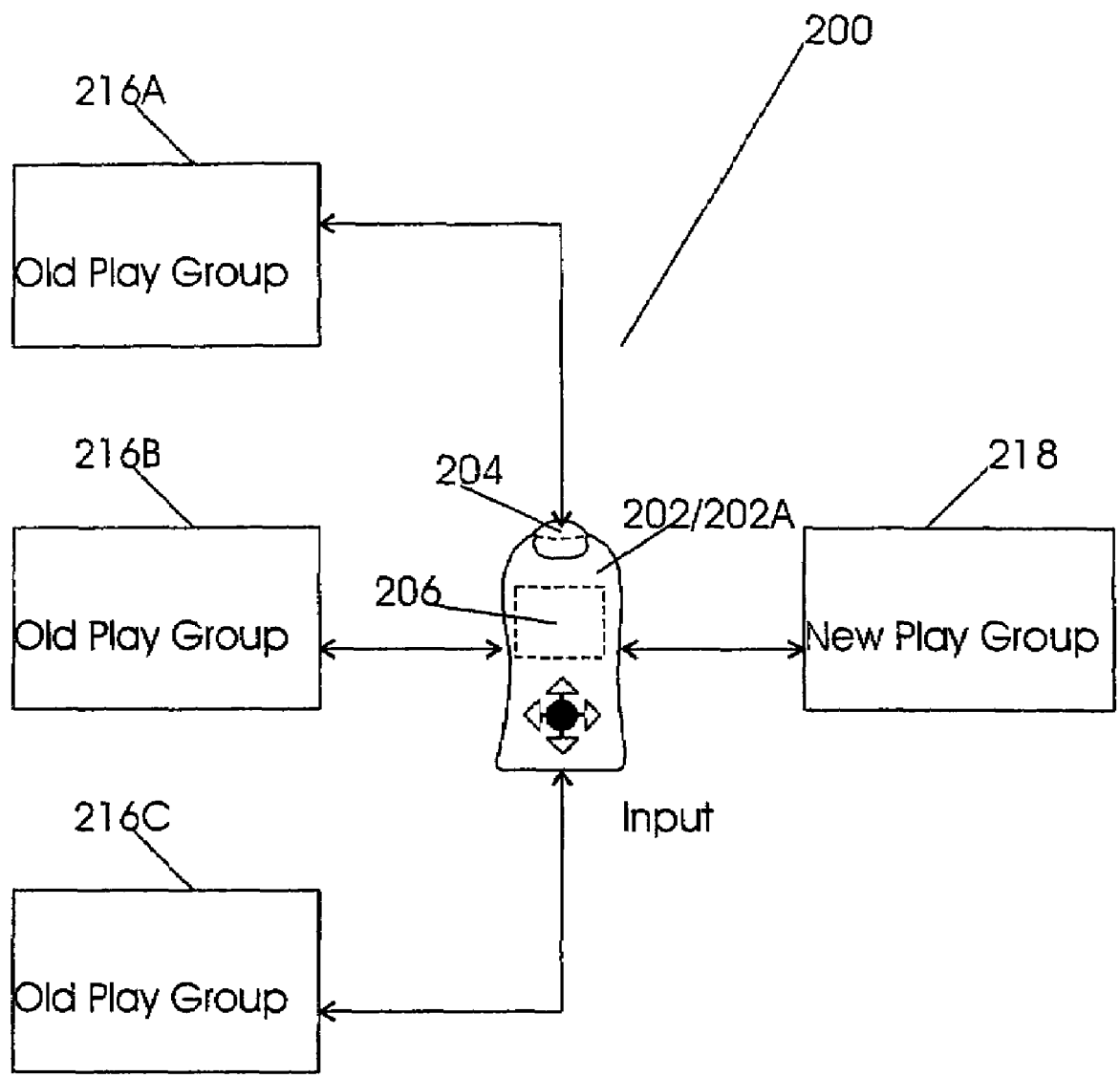
FIG. 2 is another diagram view of an auto multimedia player organizer system for a multimedia player in accordance with another embodiment of the invention.

Turning now in detail to the drawings, FIGS. 1-2 show two diagrams of an auto multimedia play organizer system 200. The system and method may be performed by software executing on the processor of a multimedia player 202A or other portable music playback device. An input unit 202 contains a ball or sphere 204 on an upper or top portion of the housing of input unit 202 and a display device shown as a small LED or LCD screen 206 in a front portion of the housing.

Sphere 204 is typically made of elastic or similar material having a certain surface slipperiness for smooth rotation by a user. Sphere 204 can be freely rotated in any direction to provide corresponding cursor movements in X-Y direction on a graphical user interface appearing on display device 206 and can be pressed and released in an up-and-down direction when click function is desired. The ball unit may be located at the top or front side of a hand-held multi-dual function mouse 202 incorporated into a multimedia player 202A and may be operated by the thumb of the user to produce rotations of ball 204 in any direction and vertical pressing down of the ball to activate click function simultaneously as shown for example in Applicant's U.S. Pat. No. 6,809,722 to Mei et al., entitled "Hand-Held Mobile Mouse," the disclosure of which is incorporated herein by reference.

The ball unit may be replaced with any kind of input device or part. Input unit 202 can take the form of the mouse of a mini multimedia player 202. Input unit 202 can be any kind or input device, such as a conventional mouse, a trackball, a joystick, an arrow disc, a knot, a keypad, or a mini keyboard. Multimedia player 202A can be any kind of media player, such as a CD player, memory stick player, a PC media player, a PDA player, a game player, a cellular or satellite phone player, or an earphone player. Preferably, the mobile multiple dual function mouse/multimedia player 202/202A is combined into one mini hand held body. Of course, the multimedia player 202 can be used as an input device for a PC desk/notebook computer, a PDA, a cellular/satellite communicator, and an internet device. At the same time, the multimedia player device 202A can be used as a mini player device for a music player, a photo player, a game player, and a communication player combined with email/internet functions, word processing software, phone, video, map, or date operating system, like a micro computer or similar device.

The LED/LCD screen 206 serves as a display for mini multimedia player 202A. The small LED/LCD screen 206 located on the front side of multimedia player 202A shown in FIGS. 1-2 serves to display multimedia menus, programs, contents, and a single cursor or multiple cursors. Display unit 206 may contain one or more LED/LCD screens. The LED or LCD screen can be replaced with any kind of larger display screen of a desktop/notebook computer, television (TV) set, or similar device.

A source unit 208 contains all digitalized data saved in hard drives, memory cards or memory sticks, or in a computer network, cellular/satellite communicator, or internet server. All new programs and contents will be saved into source unit 208 also. Source unit 208 can be inside the wireless hand-held multi-function mouse/multimedia player 202/202A or externally independent or connected to a desktop/notebook computer, a computer, satellite, or cellular network, or an internet server.

In other words, source unit 208 is an internal or external storage unit for the multimedia player 202 to store all saved multimedia files and contents. Storage unit 208 contains one or more fixable or removable memory units and can be replaced with one or more fixable or removable hard drives or memory chips from a desktop/notebook computer, a computer, a computer network, a cellular/satellite communicator, or an internet server.

A CPU unit 210 runs and processes all computerized programs. CPU 210 may contain one or more micro central processing units. CPU unit 210 can be inside the wireless hand held multi-function mouse 202 or multimedia player 202A or be externally independent or connected to a desktop/notebook computer, a computer, satellite or cellular network, or an internet server.

In other words, process unit 210 may be one or more internal or external micro central processing units for multimedia player 202 in order to process all input commands of a user and to execute those commands and their related files and contents through the storage unit or units 208 into display device 206 in order to show computerized results to the user.

Process unit 210 may contain one or more fixable or removable micro CPUs and can be replaced with one or more fixable or removable CPUs from a desktop/notebook computer, a computer network, a cellular or satellite communicator, or an internet server.

A play unit 202 is activated by the intelligence curser/scroll functions, calling the files from source unit 208, processing them in CPU unit 210 and displaying or operating the files in an automatically priority-sequenced way to form on the small LED or LCD screen 206 a playlist of files or other media items in a particular order for a user to manipulate or play them. Play unit 212 can be inside the wireless hand-held multi-function mouse 202 or multimedia player 202A or externally independent or connected to a desktop or notebook computer, a computer, satellite or cellular network, or an internet server. Play unit 212 can play a single song or more than one single song, album of songs, group of albums, set of electronic books or images, or other digitalized item, such as a photo, phone call, audio, video, or script file, or other media item.

An output unit 214 serves to display all new results and contents on computerized screens or on the small LED or LCD screen 206 and to save all new programs and contents into source unit 208. Output unit 214 can be inside the wireless hand-held multi-function mouse 202 or multimedia player 202A or externally independent or connected to a desktop or notebook computer, a computer, satellite or cellular network, or an internet server.

Wireless hand-held multi-function mouse 202 or multimedia player 202A may contain other well-known units or features (not shown). For example, mouse/multimedia player 202/202A may have a hand-held shaped mini body, current circuit boards, a battery unit, a battery recharge unit, buttons and switches, remote wireless communication units, a wireless or cabled earphone unit (which may include at least one wireless earphone set), a micro speaker, a mini keyboard, an internal or external antenna, or other similar features.

The above functions or the functions discussed below of the multimedia player 202A can be applied in a desktop or notebook computer, a computer network, a cellular or satellite communicator, or an internet server. In addition, all these functions may be implemented or operated at a desktop or notebook computer, a computer network, a cellular or satellite communicator, a transport audio and video system, or an internet server and then transferred into the multimedia player.

It should be understood that the functionality described herein may be achieved in any of a variety of ways which one skilled in the art would know how to implement from the description of the functions set forth herein.

FIG. 2 shows another diagram of new playgroup organizer system 200 which serves to organize a plurality of previously stored or existing playgroups, files or lists 216A, 216B, 216C accessible via input unit/multimedia player 202/202A. Input unit/multimedia player 202/202A includes a sphere 204 and a display device or screen 206. A user operates input unit/multimedia player 202/202A to listen or play one file from any of old groups 216A, 216B, 216C. First, a user can use multimedia player 202A to download all songs, albums, play groups, or other media items from a PC computer, a notebook computer, a CD player, the internet, a cellular or satellite communicator, or the radio. At that time, all files and songs are stored in the multimedia player 202A naturally in an order in accordance with time of creation, receipt, or downloading. If the user wants to change or organize the files or songs into a new album or play group 218 or reorganize them within the old play group 216A, 216B, 216C at any time or situation, he or she activates the intelligence cursor (shown in FIGS. 3-7) to apply a cursor click sequence function on that file or song to select his or her desired priority arrangement in new group 218 or old group 216A, 216B, 216C which may be done according to any kind of multiple crossover/non-hierarchical combination of one or multiple categories. Thereafter, a new group 218 may be created with the files or songs arranged automatically in a priority sequence.

The old groups 216A, 216B, 216C and the new group 218 can contain any type of digitalized audio, video or script file or section, such as a single song or photo, an album of songs or photos, a group of albums or photos, or other digitalized item used with or operated by the multimedia player 202A or other digital device. In other words, this method of using an intelligence cursor 280 is not limited to creating a traditional hierarchical structure or natural download format but rather can selectively and automatically prioritize media items so that a user can organize a new group 218 of songs or other items as desired much more easily and efficiently.

Figure 3:
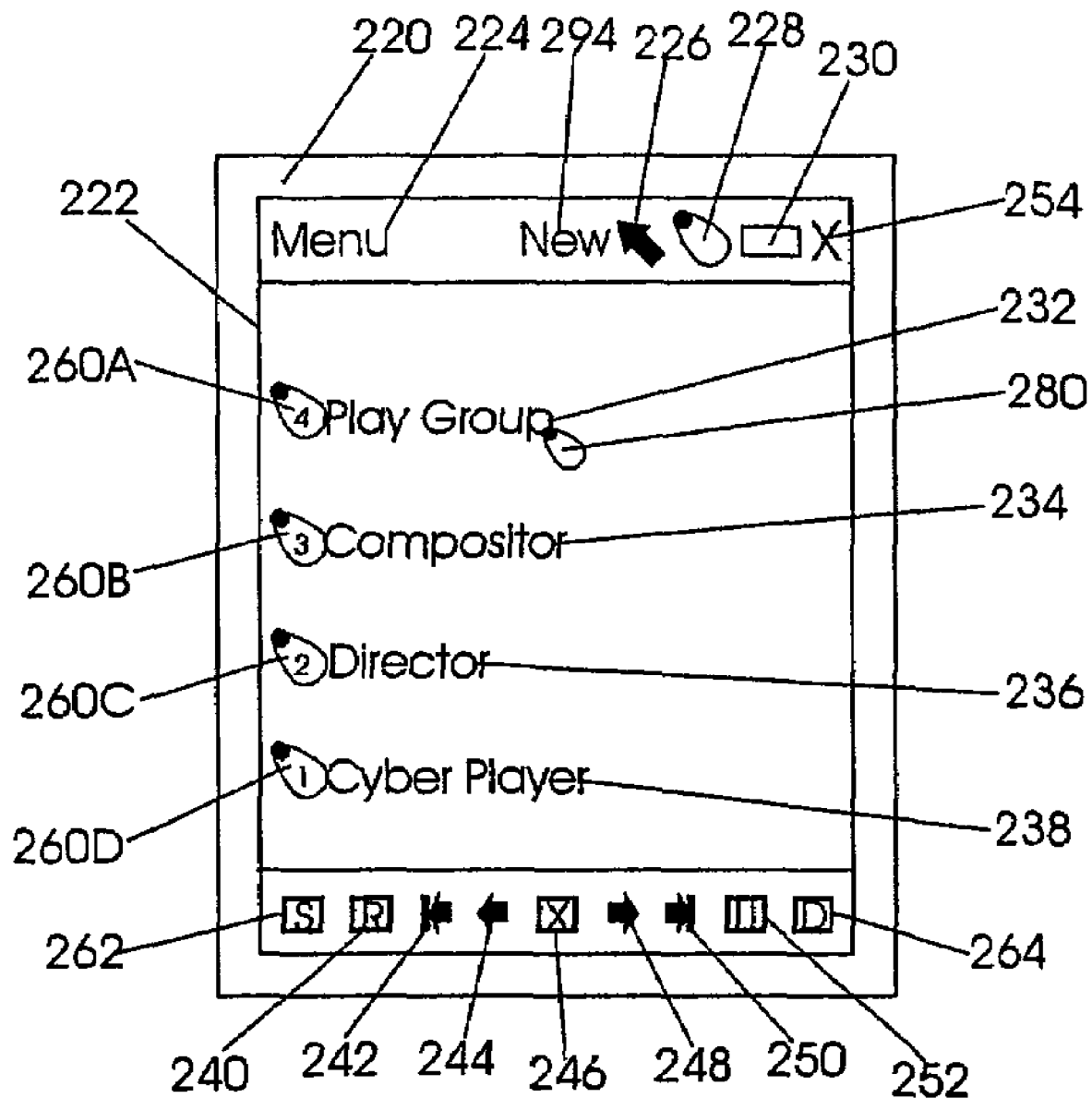
FIG. 3 shows a first embodiment of an interface of an auto multimedia organizer system for a multimedia player in accordance with the invention.

FIG. 3 shows a first embodiment of an interface implementing the play menu any group auto organizer system 200 for a multimedia player 202A. The interface includes a screen space 220 which can be part of the small LED or LCD screen 206 or of larger screens, such as a screen of a desktop or notebook computer, a cellular or satellite communicator, a TV set, or other display device. A border frame 222 serves to provide an area for available commands, display of contents, and cursor operation or control. A menu symbol or indicia 224 is provided which when selected permits the user to access the menus of media items. A traditional cursor symbol 226, an intelligence cursor symbol 228, a battery level indicator 230, and a close X mark 254 are also displayed, preferably on the top right corner of screen 220. Additional user selectable items include play group 232, compositor 234, director 236, and cyber player 238 with associated sequence symbols 260A, 260B, 260C, and 260D respectively.

Play group 232 implements file organization, play or song organization, play or video organization, or play operation. Intelligence cursor 280 permits the user to explore all intelligence function commands. Compositor 234, permits the user to perform audio and video editing by artist name or any other suitable composition name or category. Director 236 permits the user to make mini movies. Cyber player 238 permits the user to engage in cyber space playing.

When intelligence cursor 280 points and clicks on playgroup 232, the playgroup is opened to show a menu or sub-interface setting forth all items stored under this group name in source unit 208. A user can then apply the intelligence cursor click sequence commands on those items to organize them in the order of priority he or she wants. A user can create new files from old files, new folders from old folders, and a new automatic priority arrangement for each item saved in those new or old files or folders by using sequence function commands of the intelligence cursor 280.

Intelligence cursor 280 is created through software so as to have cursor sense and cursor sequence functions that can be simultaneously operated together on a computerized or digitalized file, folder or item name or symbol on any suitable computer device, such as a PC or multimedia player 202A. The sequence function of intelligence cursor 280 causes all files, folders or items to be sequenced or arranged automatically by the amount of times the intelligence cursor senses and clicks on the file, folder or item name or symbol or the numbers on that file, folder or item name or symbol.

Two types of objects in the computer operating system are displayed on the screen. One type of object is a command object that serves to identify a user selectable item associated only with a computerized command. Another type of object is a content object that serves to identify a user selectable item associated only with computerized or digitalized contents. Of course, a program object may also be displayed on the screen if needed. There are at least four types of content objects. A first type is for hard drive contents and names, a second type is for folder contents and names, a third type is for file contents and names, and a fourth type is for item names and contents. Usually, hard drive names are preset and unchangeable; however, folder names, file names and item names need to be organized or arranged from time to time in accordance with different desires of the user, especially with respect to a device such as mini multimedia player 202A. When a traditional cursor points and touches a file name, a folder, or item name, a user has the ability to carry out only a click open or drag command using one click or a double click. A traditional cursor as used in a multimedia player, a PC computer, a notebook computer, a PDA, or a cellular, satellite or internet communicator has no cursor click sequence function. Accordingly, an intelligence cursor is provided to perform organization functions as discussed herein.

When the intelligence cursor symbol 228 is activated, intelligence cursor 280 starts to work and can be used to detect an object displayed on the screen 206 and to determine whether it is a command type or a content type. If the intelligence cursor 280 touches a content object, it will detect whether the object is an end-user content, a file name, a folder name, or an item name.

If the intelligence cursor 280 detects a file name, a folder name, or an item name, a user can click one time or multiple times to carry out a click sequence function which will organize the archives or contents of the file, folder or item.

For easier and faster identification of a file name, a folder name or an item name, sequence symbols 260A, 260B, 260C, and 260D can be placed in front of a file name, folder name, or item name. The symbols 260A-260D can take the form of a red-node mouse as shown in FIG. 3 or any kind of symbol or shape with a sequence number inside or outside the symbol.

When the intelligence cursor symbols 260A, 260B, 260C, 260D are placed in front of the file names, folder names, or item names, the intelligence cursor 280 will sense and apply click sequence on those symbols 260A-260D. At the same time, the item names 232, 234, 236, 238 after the symbols 260A, 260B, 260C, 260D will still be operable by the intelligence cursor 280 for traditional cursor click-open or click drag functions.

If a section of an end-user content or object is blocked or associated into a blocked section, the intelligence cursor can detect that association or block and carry out the click sequence function to move the contents of the entire block up or down as desired.

When a file, folder, group or other item is imported from an outside source, the auto playgroup organizer system 200 will ask a user whether he or she wants to assign an auto sequence symbol to that file, folder, group or other item. In that situation, all numbers inside the sequence symbols are one. A user can then use the functions of intelligence cursor 280 to reorganize the items.

The intelligence cursor 280 has the additional function of remembering, recording, or analyzing all click times, methods, and special assignments associated with each sequence symbol. Therefore, a folder, file, group or other item can be automatically and freely organized into a selected format of the auto sequence organizer system 200 combined with a time frame data set, personal name data set, item type data set, or mixed style data set for the multimedia player 202A without the necessity of and beyond a simple hierarchical organization. Generally, by using different colors or shapes, the intelligence cursor 280 can organize every song or other item in multimedia player 202A without being limited to a hierarchical structure, format or interface, for different artist names, album names, song names, content types, and chronicle ways, or all mixed together entirely or partially.

Intelligence cursor 280 also has the function of screen moving or scrolling. This function will be discussed below with respect to FIGS. 6 and 7.

Intelligence cursor 280 also retains basic traditional cursor functions such as moving, pointing, positioning, dragging, blinking or similar functions.

Intelligence cursor 280 may also work together with a traditional cursor or be integrated or combined with a traditional cursor into one cursor displayed on the LED or LCD display 206 of multimedia player 202A. Preferably, both cursors are designed to be interchangeable at any time in any situation. A user can switch the traditional cursor into the intelligence cursor 280 by pointing and clicking on the traditional cursor icon on the intelligence cursor symbol 228 displayed at the corner of the LED or LCD screen 206 of multimedia player 202A. Preferably, a user can apply a color to a group of albums or play list using the intelligence cursor 280 of the group organizer system for multimedia player 202A.

Each file name, folder name, or other item name may contain a sequence symbol in front of the name. The sequence symbol serves as an identification (ID) number for the associated item. A user can set up a number, for example "O", in the sequence symbol boxes 260A, 260B, 260C, 260D as a special symbol or signal to cause playing of the item to stop or pause, become disabled, or be skipped. A switch (not shown) may be provided to set up the numbers in the sequence symbol boxes 260A-260D to move up or down or increase or decrease in value. Intelligence cursor 280 is designed to sense whether the object it comes in contact with is a file name, folder name, or other item name, or a sequence symbol each time it comes in contact therewith. If the intelligence cursor 280 senses an object as an item name, intelligence cursor 280 will function as a traditional cursor to carry out click-open or click-drag functions. If the intelligence cursor 280 senses an object as a sequence symbol, intelligence cursor 280 will function as a click-sequence cursor to carry out auto sequence functions of organizer system 200.

Intelligence cursor 280 can take the form of different designs or shapes and may be a symbol or have a specifically designed appearance.

The functions of intelligence cursor 280 can be used in conjunction with a desktop or notebook computer, a computer network, a cellular or satellite communicator, a transport audio or video system, an internet server, or similar system.

The location on the screen, the size, the shape, the design, the arrangement, and the method of operation of intelligence cursor 280 may vary.

A left click button (not shown) may be provided to select the songs in an album or play group list of the auto organizer system or to form during selecting or organizing a new group in the organizer system of the multimedia player 202A.

A right click button (not shown) may be provided to deselect the songs in an album or play group list of the auto organizer system or to form during selecting or organizing a new group in the organizer system of the multimedia player 202A.

A record button 240, a go back to the end button 242, a go backward or reverse button 244, a stop button 246, a go forward button 248, a go forward to the end button 250, and a pause button 252 may also be provided. A save button 262 and a delete button 264 may also be provided for file or group saving and deleting, respectively.

The location, size, shape, design, arrangement, and method of operation of these function buttons may vary. All buttons can be provided with or be represented by numbers or symbols in whole or in part.

Th borders 222 of the screen 206 can be made to appear visible or invisible or take on any style, design, shape, or method of operation. For a large desktop or notebook computer, cellular or satellite communicator, or TV screen, the actual working section or lines can be set up to be, for example, one line, two lines, or three lines up from the actual border 222.

Preferably, the working section of the borders 222 can be divided into additional sections by a user. Preferably, the touching sensitivity level of the LED or LCD screen 206 can also be selected by a user so as to be more or less sensitive to touch.

Figure 6:
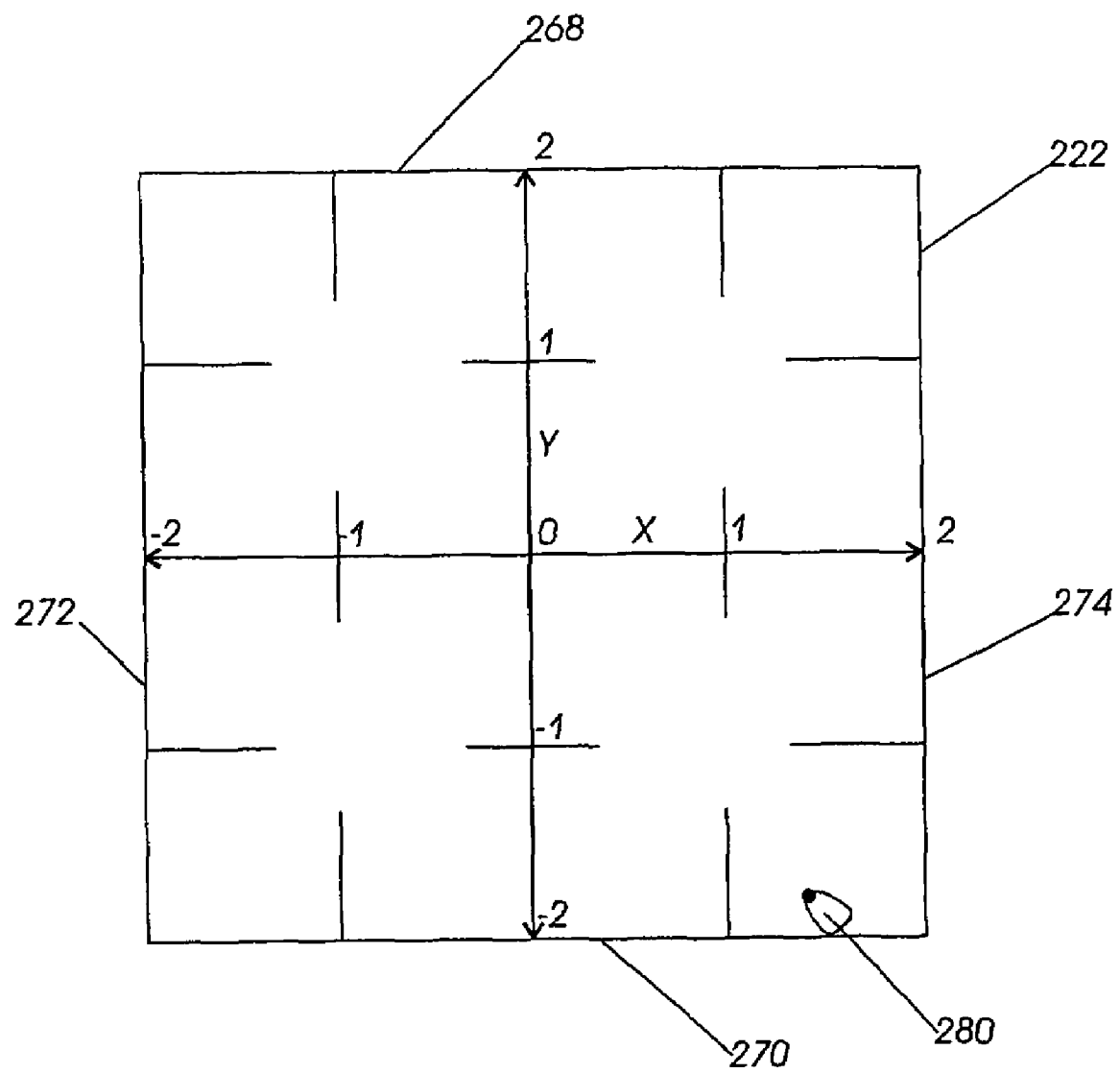
FIG. 6 is a selection view of an embodiment of an auto multimedia player organizer system for a multimedia player in accordance with the invention.

Multiple small screens or sub-interfaces (not shown) may be provided for each program displayed and operated inside the larger entire screen 206. Preferably, each screen or sub-interface has intelligence cursor-touching-border-moving function (as illustrated in FIG. 6).

A new/add function 294 may also be provided in multimedia player 202A.

When the new/add function 294 is activated, the programmed software operates to pop up the question: "New or Add?" If "New" is selected, another question pops up: "New Album or Play Group or Item Name?" Usually, the new name is preset or automatically assigned letters or numbers, such as Song A, Song B, Song C, or Song 1, Song 2, Song 3, by the multimedia player 202A due to the limitations on working pace and the limitations of input functions. The new name may also be assigned by a user from an outside and/or inside source or sources, including outside and/or inside inputs. After confirming the new name, a user can go to any album, play group, or file to select any song or other item he or she wants with the intelligence cursor 280 to place and assign the item in the new album being created. Thereafter, the user can save the arrangement as a part of a new group of albums, for example, in a selected priority even when he or she is listening to the new album.

In addition, while he or she is listening to a song, the user can activate the intelligence cursor 280 to execute a function of auto organizer system 200 in order to create a new organization with a new name. After entering the new name, the user can select every song he or she likes by the number of point or click times to form an auto organized song list in a new album. If a user does not select a new organization, he or she can select each song he or she likes by the number of point or click times to cause a reorganization of his or her song list within the old organized album or group name.

If a user selects the Add function under the New/Add function 294, he or she uses the current running album he or she is listening to or provides the old organization or album or play group name to retrieve an associated item from the storage unit in order to display, play, or reorganize it.

Figure 4:
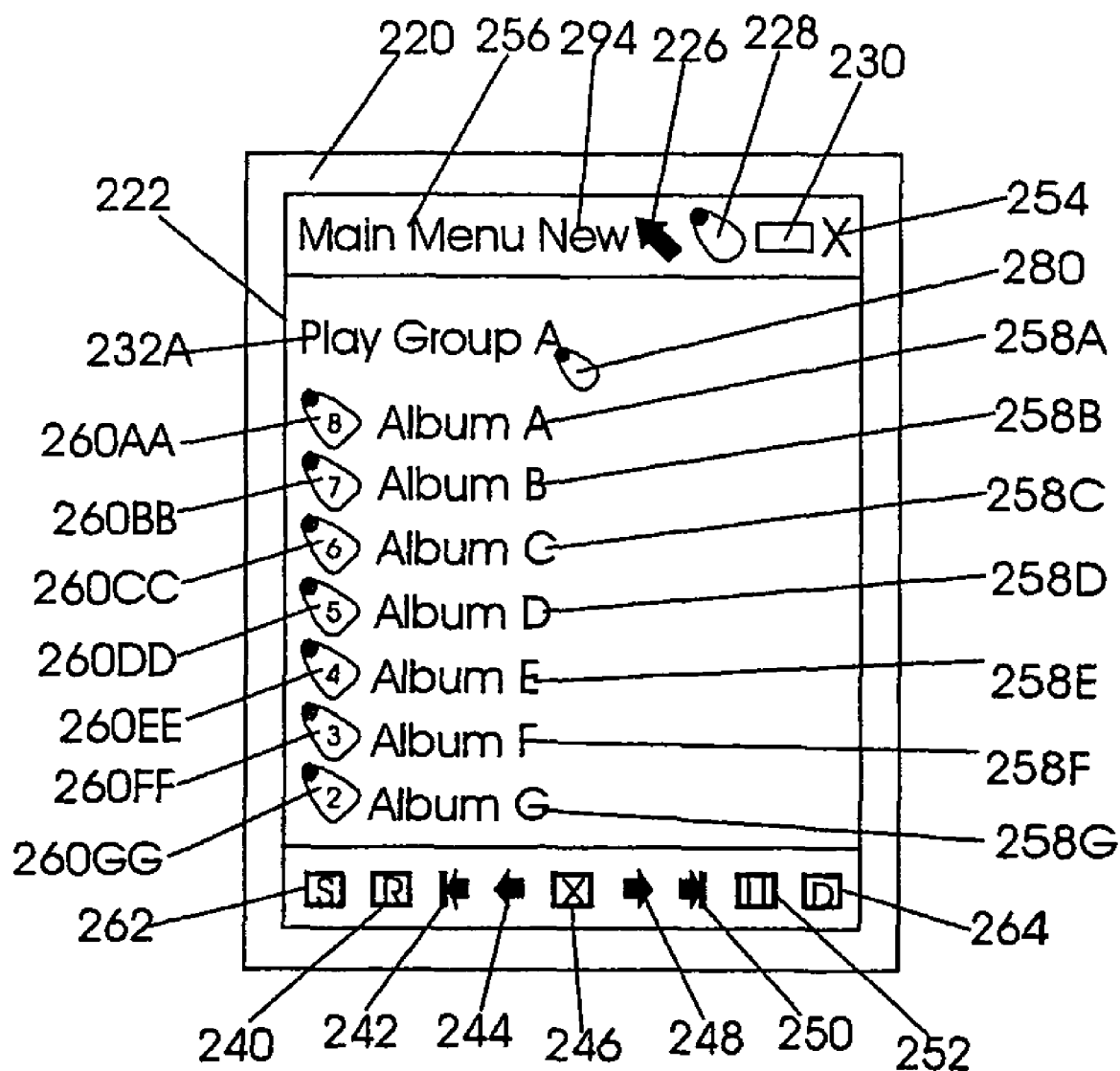
FIG. 4 shows a second embodiment of an interface of an auto multimedia organizer system for a multimedia player in accordance with the invention.

FIG. 4 shows another kind of interface for play menu and group auto organizer system 200 of multimedia player 202A. A main menu indicia 256 is provided for a user to go back from the interface shown to the main menu 224 shown in FIG. 3. A screen space 220 is provided by the interface on the display device. Screen space 220 can be part of the small LED or LCD screen 206 or of a larger screen from a desktop or notebook computer, a cellular or satellite communicator, a TV set, or similar display device. A border frame 222 is provided to frame the available display and cursor working area. A main menu indicia 256, a traditional cursor symbol 226, an intelligence cursor symbol 228, a battery level indicator 230, and a close X mark 254 are displayed on the top right corner of the screen 220 and serve as user selectable items to activate the functions associated with the items. For example, selection of intelligence cursor symbol 228 activates intelligence cursor 280 in screen area 222.

A playgroup 232A can be represented by a name or a number. For example, as shown in FIG. 4, sub-play groups-albums 258A, 258B, 258C, 258D, 258E, 258F, 258G are contained under playgroup 232A. Associated respectively with the albums 258A-258G are priority sequence symbols 260AA, 260BB, 260CC, 260DD, 260EE, 260FF, 260GG. Priority arrangement symbols 260AA-260GG may contain numbers on the inside or the outside of the symbols that serve to show priority sequence arrangements.

Each file name, folder name, or other item name may contain a sequence symbol in front of the name. For example, the sequence symbol 260AA serves as an ID sequence number for the item 258A. A user can set up number "0" in the sequence symbol boxes 260AA-260GG as a special symbol or signal to activate the function of causing play to stop, pause, become disabled, or be skipped. A switch (not shown) may be provided to set up the numbers in the sequence symbol boxes 260AA-260GG and cause the numbers to move up or down or increase or decrease. The intelligence cursor 280 will sense whether the object is a file name, a folder name, or an item name, or a sequence symbol each time intelligence cursor 280 comes in contact with the object. If intelligence cursor 280 sense an object is an item name the intelligence cursor 280 will act like a traditional cursor to carry out click-open or click-drag functions. If the intelligence cursor 280 senses an object is a sequence symbol, the intelligence cursor 280 will act like a click-sequence cursor to carry out auto sequence organizer functions.

For example, as shown in FIG. 4, the album 258A contains the sequence symbol 260AA in front. The sequence symbol 260AA serves as an ID number for the album 258A. For a user, sequence symbol 260AA and album 258A represent the same identical thing. They move, work, and save together. A user activates the intelligence cursor 280 by switching from the traditional cursor symbol 226 to the intelligence cursor symbol 228. The user then points the intelligence cursor 280 on the album 258A and carries out traditional click-open or click-drag functions if desired. He or she can point the intelligence cursor 280 on the sequence symbol 260AA and carry out the click-sequence function of intelligence cursor 280 to organize the album 258A in a selected priority way he or she wants. The sequence symbols 260AA-260GG accept and operate the sense and click-sequence functions of the intelligence cursor when the intelligence cursor comes in contact with the sequence symbols.

The more times the intelligence cursor 280 clicks on the sequence symbols 260AA-260GG, the higher the priority assigned to those albums 258A-258G. The number of click times will be displayed inside or outside the priority symbols 260AA-260GG. For example, as shown in FIG. 4, the priority symbol 260AA contains the number 8, which means that symbol 260AA has been clicked eight times which represents the highest number or most click times for the items in Play Group A. Therefore the album 258A associated with priority symbol 260AA has been moved up to the top priority position. As shown in FIG. 4, the priority symbol 260GG contains the number 2, which means that symbol 260GG has been clicked only two times which represents the lowest number or fewest click times for the items in Play Group A. Accordingly, the album 258G associated with priority symbol 260GG has been moved down to the last priority position. If two or more groups contain the same priority symbol number, the first comes first, i.e. the relative existing priority between those groups remains unchanged.

A user can re-assign or de-sequence the priority numbers up or down on one group or album or for a blocked set of groups or albums by reapplying the point and click sequence function commands of intelligence cursor 280 again.

As in the interface shown in FIG. 3, a record button 240, a go back to the end button 242, a go backward or reverse button 244, a stop button 246, a go forward button 248, a go forward to the end button 250, and a pause button 252 may be provided. A save button 262 and a delete button 264 may also be provided for file or group saving and deleting respectively. The location, size, shape, design, arrangement, and method of operation of these function buttons may vary.

Figure 5:
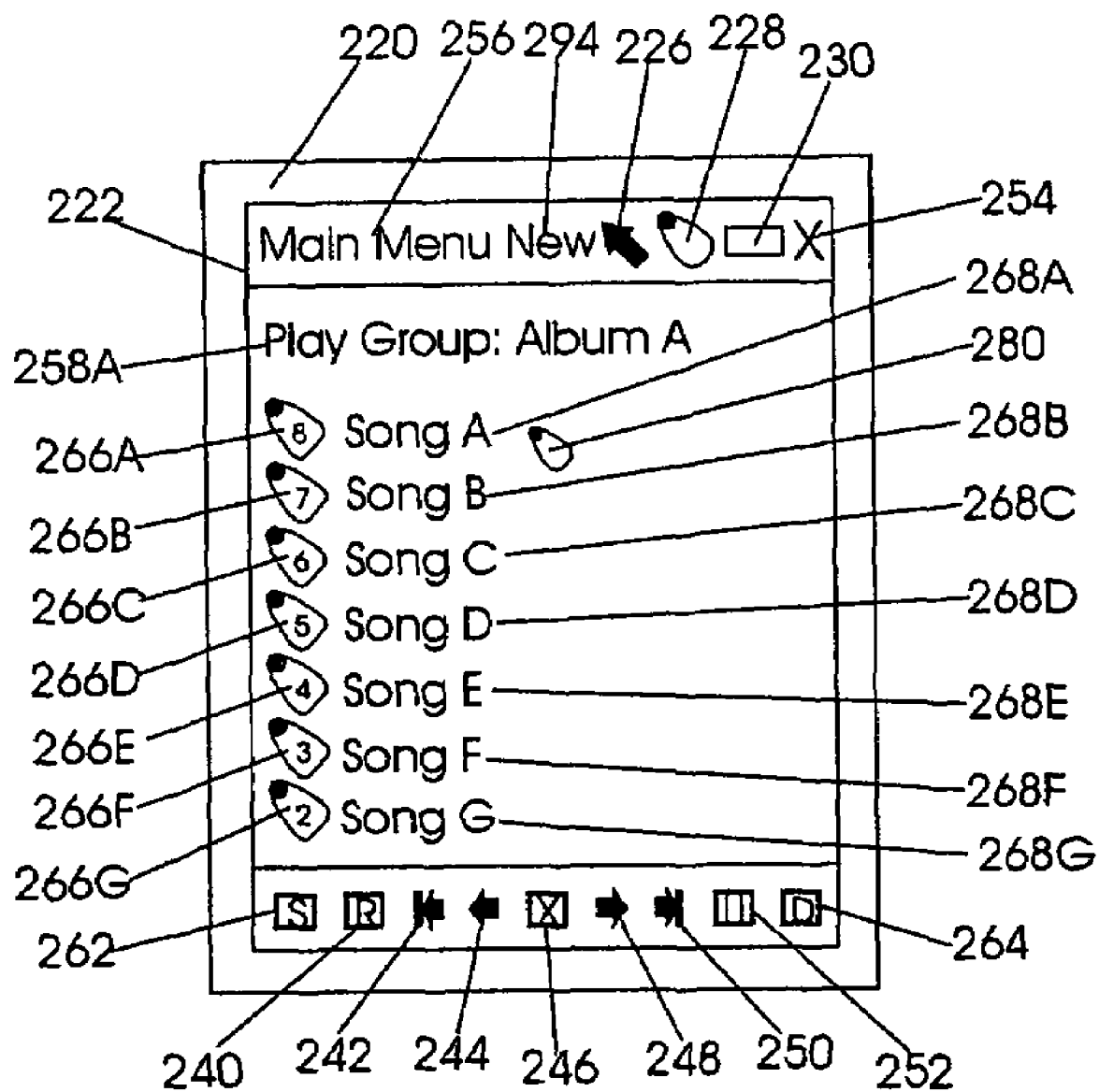
FIG. 5 shows a third embodiment of an interface of an auto multimedia organizer system for a multimedia player in accordance with the invention.

FIG. 5 shows another kind of interface for a play menu and group auto organizer system of multimedia player 202A. A main menu indicia 256 is provided for a user to go back from the interface shown in FIG. 5 to the main menu 224 shown in FIG. 3. A screen space 220 is provided by the interface on the display device. Screen space 220 can be part of the small LED or LCD screen 206 or of a larger screen from a desktop or notebook computer, a TV set or similar display device as with the interfaces of FIGS. 3-4. A border frame 222 is provided to frame the available display and cursor working area. A traditional cursor symbol 226, an intelligence cursor symbol 228, a battery level indicator 230, and a close X mark 254 are displayed on the top right corner of the screen 220 and serve as user selectable items to activate the functions associated with the items. For example, selection of intelligence cursor symbol 228 activates intelligence cursor 280 in screen area 222.

As shown in FIG. 5, album 258A has been opened and its contents displayed on the screen. Associated respectively with the songs 268A, 268B, 268C, 268D, 268E, 268F, 268G contained in album 258A are priority sequence symbols 266A, 266B, 266C, 266D, 266E, 266F. Priority arrangement symbols 266A-266G may contain numbers on the inside or the outside of the symbols that serve to show priority sequence arrangements. A user activates the intelligence cursor 280 by switching from the traditional cursor symbol 226 to the intelligence cursor symbol 228. The user then points the intelligence cursor 280 on a priority symbol before the song he or she wants to move up or down in priority and then clicks the symbol, for example, one, two or three times. The more times the intelligence cursor 280 clicks on the priority sequence symbols 266A-266G, the higher the priority assigned to the associated item, song, or priority symbol.

The number of click times will be displayed inside or outside the priority symbols 266A-266G. For example, as shown in FIG. 5, the priority symbol 266A associated with the song 268A contains the number 8, which means that this item or symbol 266A has been clicked eight times which represents the highest number or most click times for the items in this album 258A. Therefore, the item or song 268A associated with priority symbol 266A has been moved up to the top priority position.

As shown in FIG. 5, the priority symbol 266G before the song 268G contains the number 2, which means that this item or symbol 266G has been clicked only two times which represents the lowest number of lowest click times for the items in album 258A. Accordingly the item or song 268G is moved down to the last priority position.

If two or more groups contain the same priority sequence number, the first comes first, i.e. the relative existing priority between these groups remains unchanged.

A user can re-assign or de-sequence the priority numbers up or down in one group or for a blocked set of groups by reapplying the point and click sequence function commands of intelligence cursor 280 again. In this way, all items or songs 268A-268G are prioritized automatically, freely, and simultaneously in the way a user likes to play at any time in any situation.

As a further explanation, the multimedia play menu 224 may be generated into an auto playgroup organizer system 200 of multimedia player 202A by the functions of intelligence cursor 280 at any time or situation and even simultaneously. For example, while a user is listening to a song, he or she can point and click on the song eight times to express the preference that this song be given the highest or first priority and be placed on the top of an album or playgroup. The user can then while listening to the song click on another song seven times to express the preference that this song be given the second highest priority and be placed as the second item on the album or play group. These preferences or priorities can then be preserved by saving these priority commands, all without interruption of the user's listening to the album playing in multimedia player 202A. This feature is referred to as the background simultaneously organized sequence function of intelligence curser 280.

In this way, an auto playgroup organization of multimedia player 202A may be created, with the song the user wants to designate song number one placed as the first to be listened to or broadcast on multimedia player 202A and the song the user wants to designate song number two placed as the second to be listened to or broadcast on multimedia player 202A. In other words, an auto playgroup organization of items on multimedia player 202A is created with the songs arranged automatically to follow the sequence of the select-click numbers. A user can change the intelligence cursor click times associated with an item at any time or any situation by placing the intelligence cursor 280 on the song or item and clicking for example, once, twice or three times again to adjust up or down the priority level of that song in his or her album or playgroup of auto organizer system 200 in the multimedia player 202A.

As in the interfaces shown in FIGS. 3 and 4, a record button 240, a go back to the end button 242, a go backward or reverse button 244, a stop button 246, a go forward button 248, a go forward to the top or end button 250, and a pause button 252 may be provided. A save button 262 and a delete button 262 may also be provided for file or group saving and deleting, respectively. The location, size, shape, design, arrangement, and method of these function buttons may vary.

FIG. 6 shows a bordered screen 222 with another function of intelligence cursor 280 to cause screen or scroll moving up or down, right or left, in any X-Y direction in two (2D) dimensions on the screen 222. This function is provided due to the very limited space of the entire display screen 206. When intelligence cursor 280 touches certain parts of borders 268, 280, 272, and 274 of bordered screen 222, a border moving signal is generated that causes the border or that part of the border associated with the touched part to move. When border moving starts, the content inside the bordered screen 222 automatically moves backward. This feature is designed simply to allow the user to see the content moving or scrolling up or down or left or right. In this way, a user no longer needs to use a screen scroll wheel. For example, when intelligence cursor 280 touches the middle section of the bottom border 270 between X=-1 to X=-2, and Y=-2, the screen border starts moving down in a predominantly straight fashion. The content inside the bordered screen moves or scrolls up correspondingly as when a traditional scrolling occurs with a screen scroll wheel. When intelligence cursor 280 touches the right side of bottom border 270 at X=1.5 and Y=2, the screen starts moving down toward the right at an angle ratio straight down 2 to straight right 1.5. The contents displayed inside the bordered screen 222 moves or scrolls up correspondingly toward the left.

The screen 222, i.e. the content displayed, can continue to move or scroll in an X-Y direction as desired by having the intelligence cursor 280 continue to touch on these certain parts of borders 268, 270, 272, 274. If contact between intelligence cursor 280 and those parts of borders 268-274 stops, movement of the screen or content displayed stops immediately.

The intelligence cursor 280 may be adjustable with respect to its sensitivity and accuracy of touching the border or object to be selected.

Figure 7:
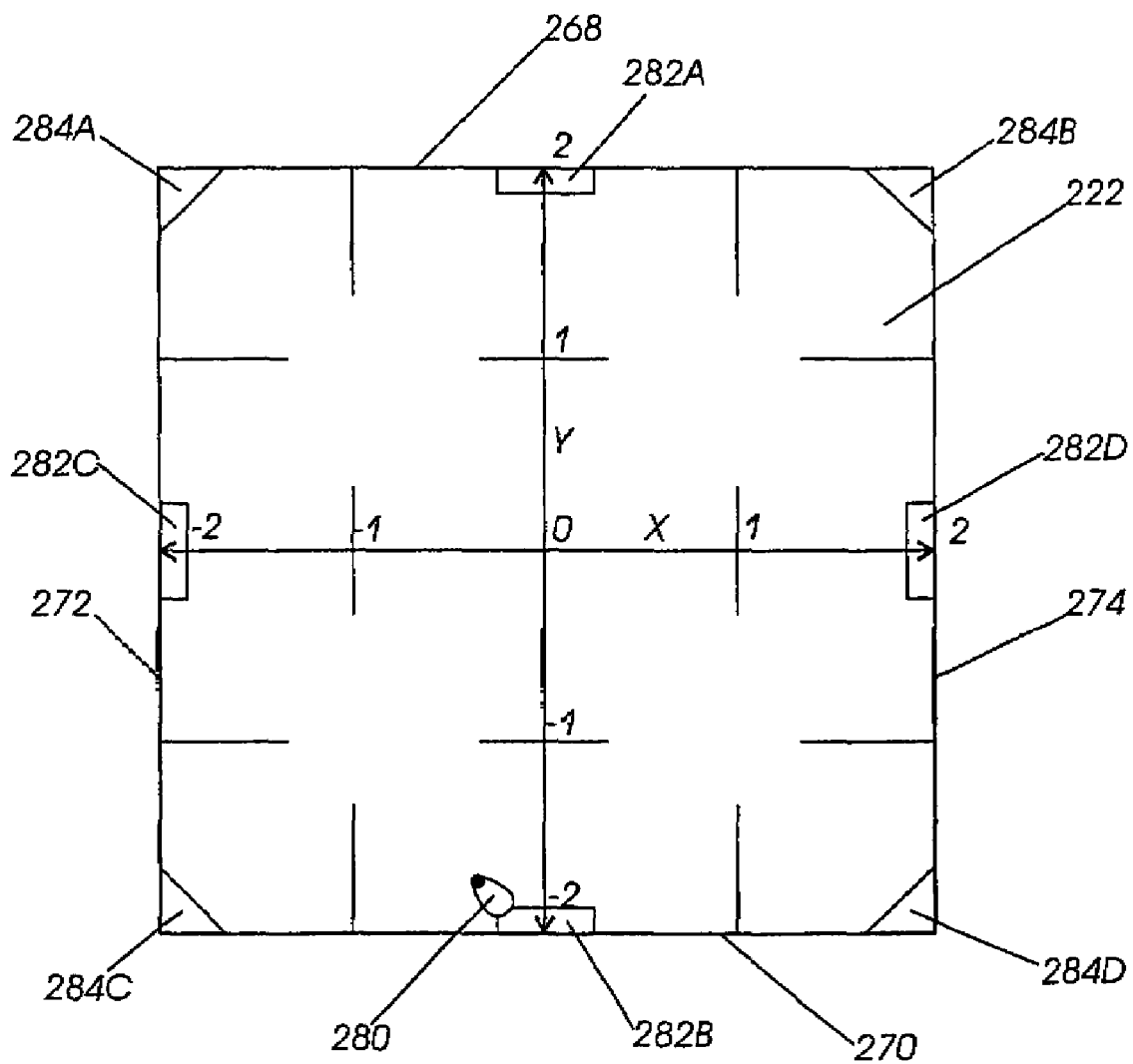
FIG. 7 is a section view of another embodiment of an auto multimedia player organizer system for a multimedia player in accordance with the invention.

FIG. 7 shows another kind of screen moving function of intelligence cursor 280 to cause screen or scroll moving up or down, right or left, in any X-Y direction in two (2D) dimensions on bordered screen 222. Little nodes 282A, 282B, 282C, 282D and little triangles 284A, 284B, 284C, 284D are placed on the borders 268, 270, 272, 274.

When intelligence cursor 280 touches those nodes and triangles 282A, 282B, 282C, 282D and 284A, 284B, 284C, 284D on the borders 268, 270, 272, and 274, an entire border moving signal is generated that causes the entire border associated with the node or triangle to move. When border moving starts, the content inside the bordered screen 222 automatically moves forward or backward. As in FIG. 6, this feature is designed simply to allow the user to see the content moving or scrolling up or down or left or right. In this way, a user no longer needs to use a screen scroll wheel.

For example, when intelligence cursor 280 touches node 282A on bottom border 268, the screen border starts moving down straight and the content inside the bordered screen moves or scrolls up correspondingly. When intelligence cursor 280 touches triangle 284D on the right bottom corner of bottom borders 270 and 274, the screen starts moving down toward the right at a forty-five degree angle. The content displayed inside the bordered screen 222 moves or scrolls up correspondingly toward the left at a forty-five degree angle.

The screen 222 or content displayed therein can continue to move or scroll in an X-Y direction as desired by having the intelligence cursor 280 continue to touch or click on those nodes or triangles 282A-282D or 284A-284D on the borders 268, 270, 272, 274. If the intelligence cursor 280 detaches from the nodes or triangles 282A-282D and 284A-184D, movement of the borders 268-274, or the screen 222, or content displayed stops immediately. The interface and intelligence cursor 280 could be programmed so that one click or one touch cause one discrete movement a certain distance and continuous clicks and touches cause continuous moves.

As with the embodiment of FIG. 6, the intelligence cursor 280 may be adjustable with respect to its sensitivity and accuracy of touching the nodes 282A-282D, the triangles 284A-284D, the borders 268-274 or other object to be operated on in similar fashion on the interface.

When the intelligence cursor 280 is activated, the cursor-touching-border moving function becomes operable. Preferably, the system may be programmed so that a user can disable or stop the screen or content moving and scrolling function at any time in any situation by using a double click command or the right click button (not shown).

Figure 8:
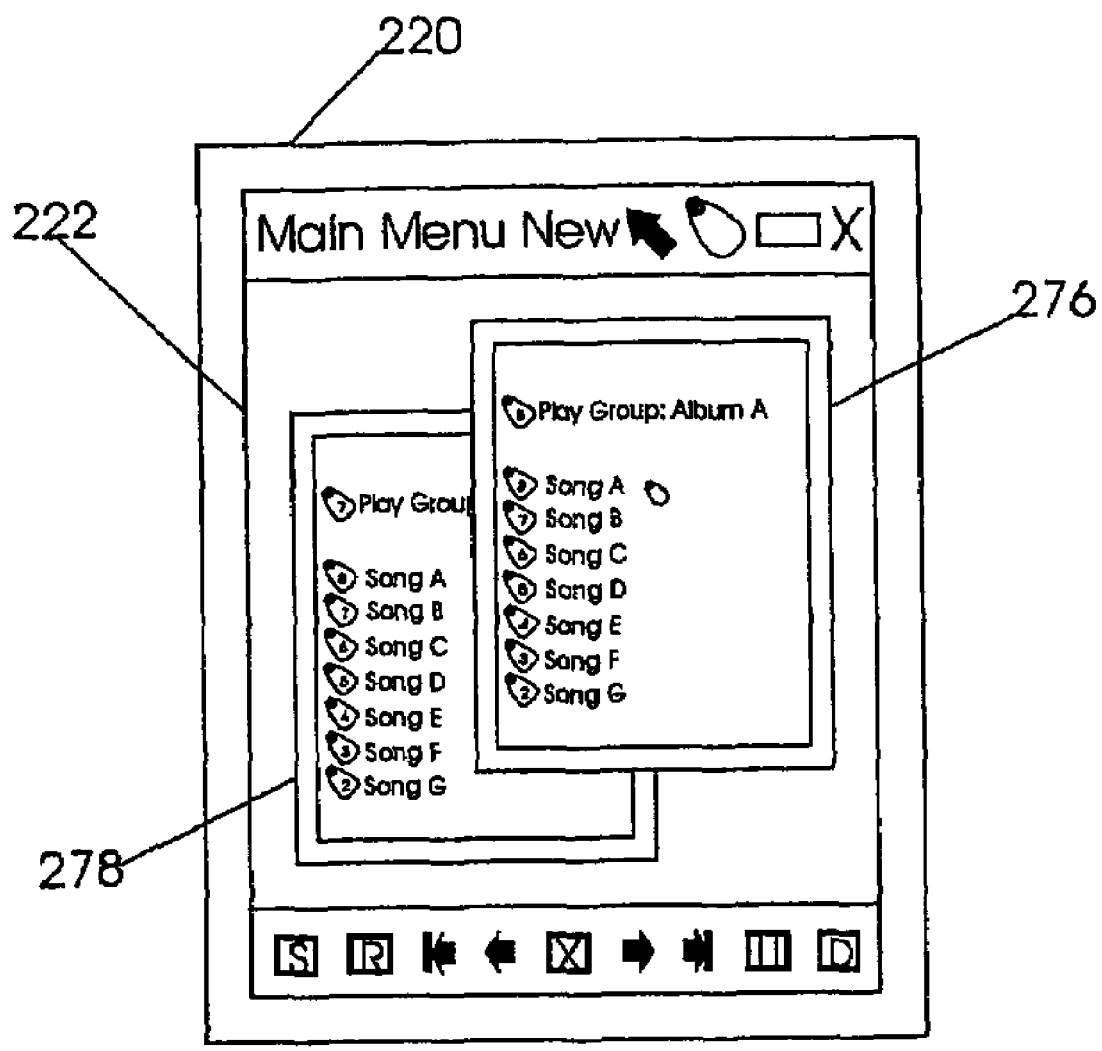
FIG. 8 is a screen view of an embodiment of an interface of an auto multimedia player organizer system for a multimedia player in accordance with the invention.

FIG. 8 shows a bordered screen 222 containing two or more sub-screens 276, 278 with different screen contents. Those two sub-screens 276 and 278 can be integrated, interchanged, and alternated with each other between front position (occupied by subscreen 276 as shown in FIG. 8) and back position (occupied by subscreen 278 as shown in FIG. 8). Intelligence cursor 280 can be applied to cause an automatic priority arrangement for the items displayed on those sub-screens 276 and 278 of multimedia player 202A.

Figure 9:
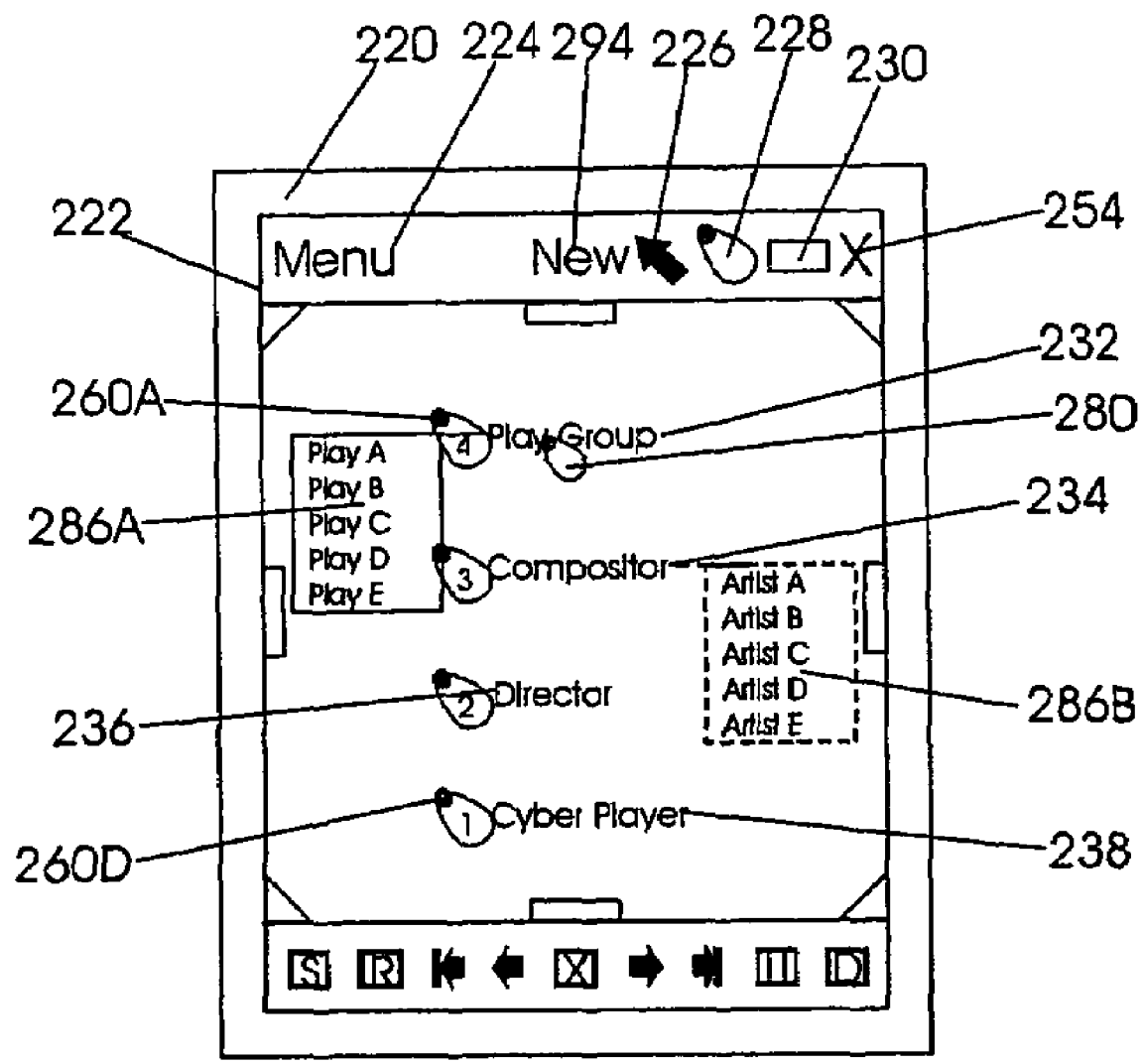
FIG. 9 is a screen view of a second interface of an auto multimedia player organizer system for a multimedia player in accordance with the invention.
Figure 10:
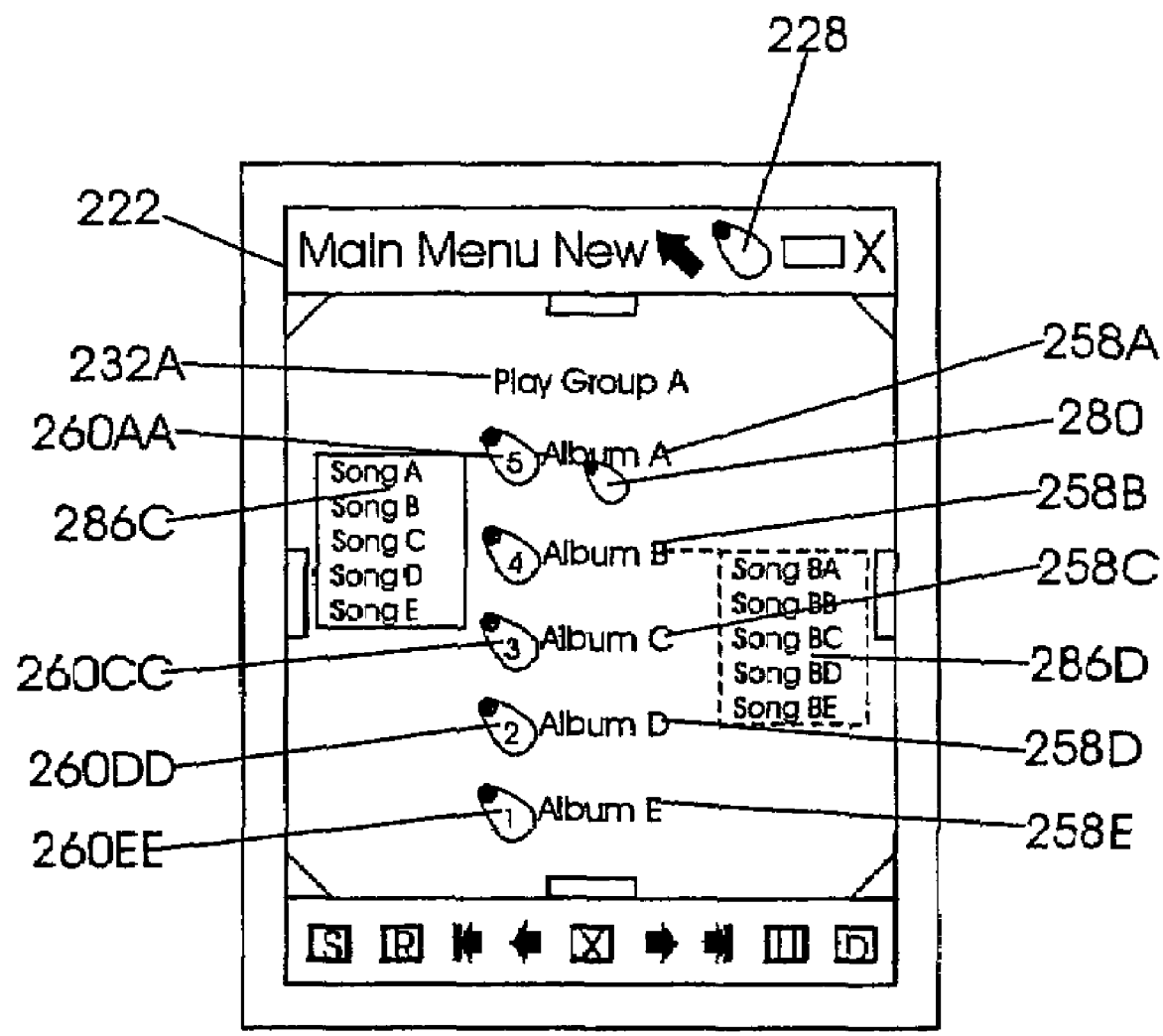
FIG. 10 is a screen view of a third interface of an auto multimedia player organizer system for a multimedia player in accordance with the invention.
Figure 11:
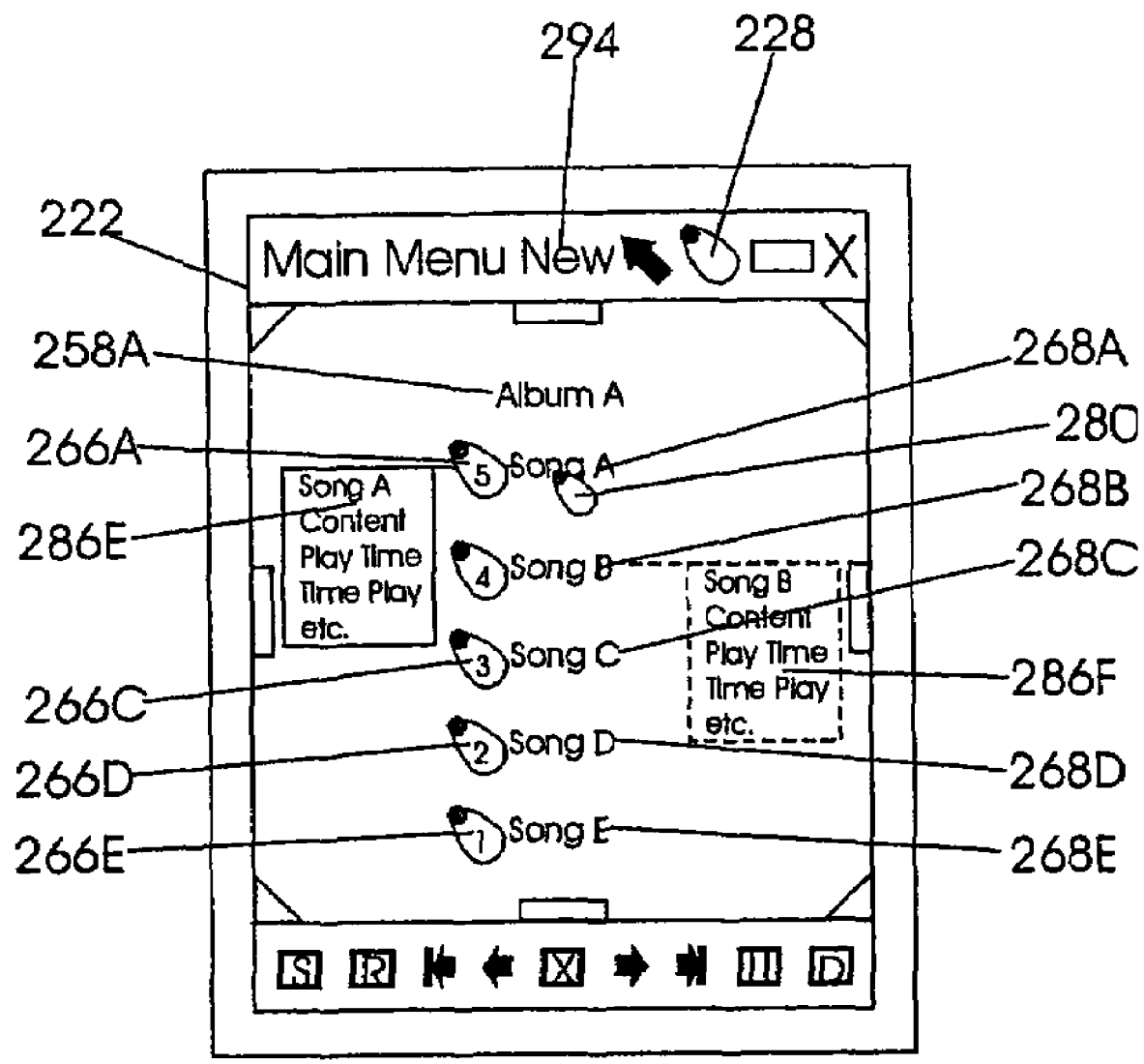
FIG. 11 is a screen view of a fourth interface of an auto multimedia player organizer system for a multimedia player in accordance with the invention.
Figure 12:
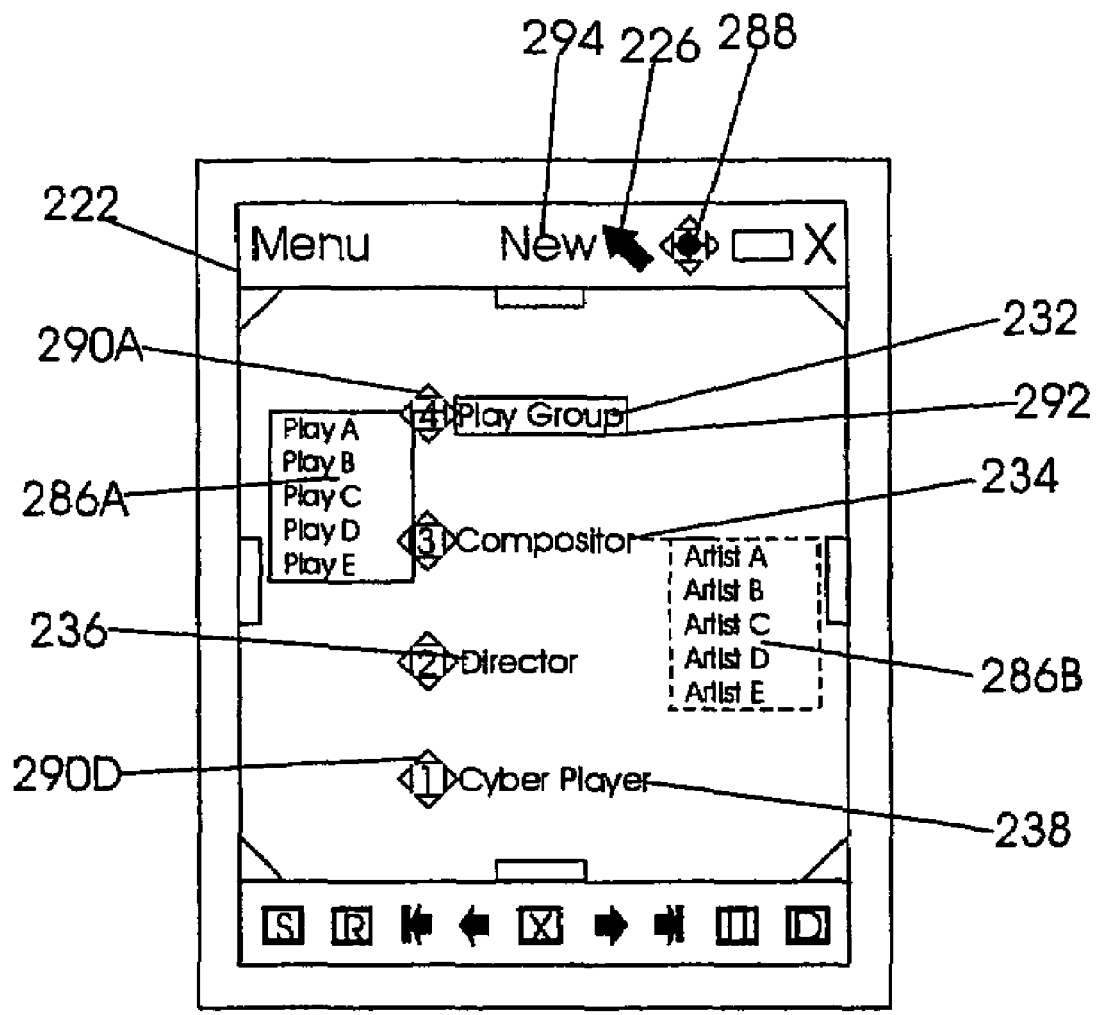
FIG. 12 shows a fifth interface of an auto multimedia player organizer system for a multimedia player in accordance with the invention.
Figure 12:
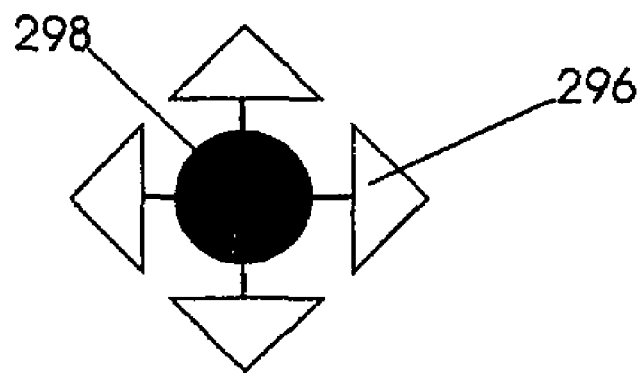

FIGS. 9-11 show other types of interfaces of the play menu and group organizer system 200 for multimedia player 202A. As shown in FIGS. 9-11, a butterfly menu design is displayed on screen 220 within border 222. All the menus 232, 234, 236, 238 (FIG. 9), 258A, 258B, 258C, 258D, 258E (FIG. 10), and 268A, 268B, 268C, 268D, 268E (FIG. 11) have associated sequence symbols 260A, 260B, 260C, 260D (FIG. 9), 260AA, 260BB, 260CC, 260DD, 260EE (FIG. 10), and 266A, 266B, 266C, 266D, 266E (FIG. 11) which are placed in the middle section of screen 220. More than two pop-up butterfly wing style displays 286A, 286B may be provided as shown in FIG. 12. When intelligence cursor 280 touches one of those menus and the associated contents, the wing style displays 286A/286B (shown in FIG. 12) pop up to show the contents of the menu or other item touched. For example, when intelligence cursor 280 touches Album A 258A (FIG. 11), the butterfly wing style display 286C (FIG. 10) pops up at the left side of Album A 258A to show the contents of Album A 258A, namely Songs A, B, C, D, E. From this list, a user can select any of Songs A-E directly. Thereafter, intelligence cursor 280 can be applied to touch Album B 258B (FIG. 10) to cause the butterfly wing style display 286D (FIG. 10) to pop up at the right side of Album B 258B to show the contents of Album B 258B, namely Songs BA, BB, BC, BD, BE. From this list, as user can select one of Songs BA to BE directly.

The butterfly style can have two ways for the same item at the same time: one at the left and another one at the right.

Figure 14:
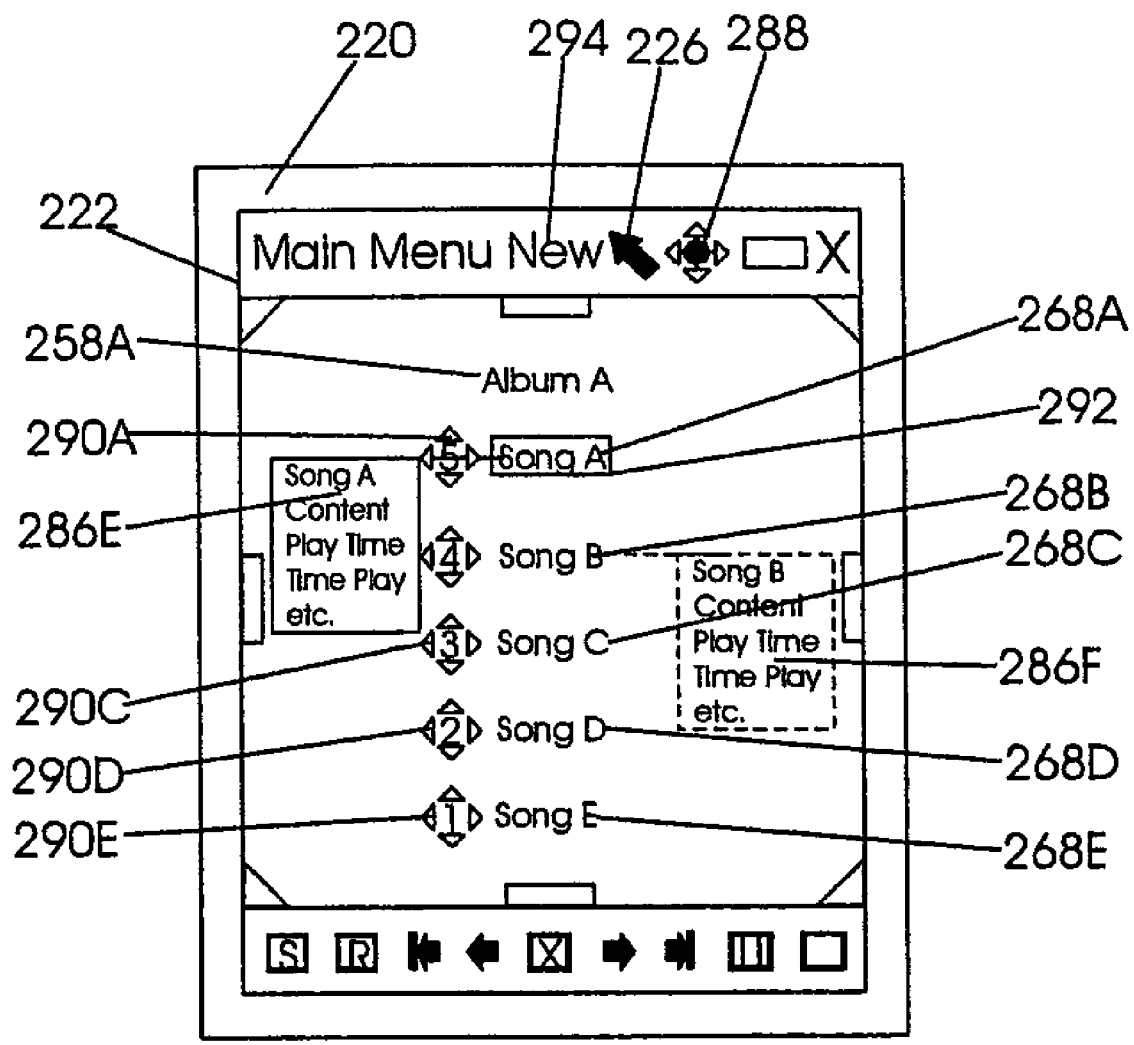
FIG. 14 shows a seventh interface of an auto multimedia player organizer system for a multimedia player in accordance with the invention.
Figure 14:
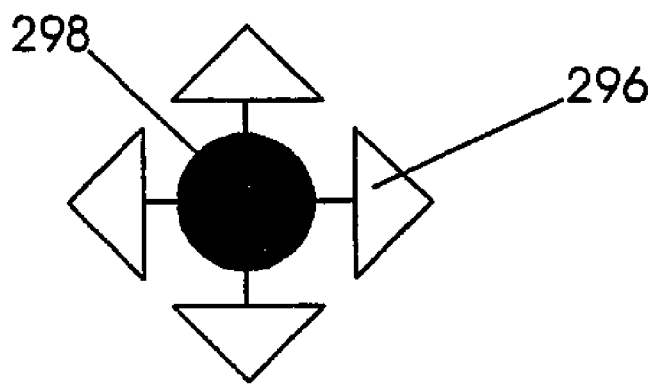

FIGS. 12-14 show other types of interfaces of the play menu and group organizer system 200 for multimedia player 202A. The player is provided with a four-way scroll arrow and press input device 296, 298 to create an intelligence scroll sequence function bar 292. In fact, intelligence scroll bar 292 may replace intelligence cursor 280 by being programmed to have the same intelligence cursor functions detailed with respect to the embodiments discussed in connection with FIGS. 1-11. Intelligence scroll bar 292 and intelligence cursor may be designed to be interchangeable and switchable with each other at any time or in any situation. The intelligence scroll bar 292 can also be used to cause screen-scroll moving function like the functions of the intelligence cursor 280 discussed in detail above with respect to FIGS. 6-7 or the functions of traditional screen scrolling.

The movements of the intelligence scroll bar 292 are controlled by scroll arrow device 296. The press command function of intelligence scroll bar 292 is controlled by scroll press key 298. Four directional arrows are provided in the arrow device 296 to cause the intelligence scroll bar 292 to move up or down or left or right. Preferably, one touch causes one discrete movement and a continues touch causes continuous movement.

An intelligence scroll symbol 288 is located at the top function bar for a user to select and activate the intelligence scroll function bar 292. Scroll sequence symbols 290A, 290B, 290C, 290D are located in front of and associated with each menu or content item.

The intelligence scroll bar 292 is created or programmed to have the ability to operate simultaneously scroll sense and scroll press sequence functions on a computerized or digitalized file, folder, and item name or symbol on any computer device such as a PC or the multimedia player 202A. The intelligence scroll sequence function bar 292 causes all files, folders, or items to be sequenced or arranged automatically by the amount of sense and click or press times or numbers imported on the file, folder, or item name or symbol.

When the intelligence scroll symbol 288 is activated, intelligence scroll bar 292 starts to work and can be used to detect an object displayed on the screen 206 and to determine whether it is a command type or a content type. If the intelligence scroll bar 292 touches a content object, it will detect whether the object is an end-user content, a file name, a folder name, or other item name. If the intelligence scroll bar 292 detects a file name, a folder name, or other item name, a user can press one time or multiple times on the scroll/press device 296/298 to carry out a scroll or press sequence function which will organize the archives or contents of the file, folder or other item. For easier and faster identification of a file name, a folder name, or other item name, sequence symbols 290A, 290B, 290C, 290D can be placed in front of a file name, folder name, or other item name. The symbols 290A-290D can take the form of an arrow or press symbol as shown in FIGS. 12-14 or of any kind or symbol or shape with a sequence number inside or outside the symbol. The intelligence scroll symbols 290A, 290B, 290C, 290D are placed in front of the file names, folder names, or other item names to serve as ID numbers and sequence priority numbers.

The intelligence scroll bar 292 will sense and apply scroll sequence on those symbols 290A-290D. At the same time, the item names 232, 234, 236, 238 after the symbols 290A, 290B, 290C, 290D will remain operable by the intelligence scroll bar 292 for traditional scroll press-open or scroll press drag functions.

The more times the sequence symbols 290A-290D are pressed, the higher the priority assigned to the associated menus 232, 234, 236, 238. The number of press times will be displayed inside or outside the priority symbols 290A-290D. For example, as shown in FIG. 12, the priority symbol 290A associated with the menu or item name 232 contains the number 4, which means that the symbol 290A has been clicked or pressed four times which represents the highest number or most press times for the menus displayed on the screen. Therefore, menu 232 associated with priority symbol 290A is moved up to the top priority position.

As shown in FIG. 12, the priority symbol 290D before the menu or item name 238 contains the number 1, which means that symbol 290D has been clicked or pressed only once which represents the lowest number or fewest press times for the menus in the group of menus displayed. Accordingly, menu 238 is moved down to the last priority position. If two or more groups contain the same priority symbol number, the first comes first, i.e. the relative existing priority between these groups remains unchanged.

A user can set up a number, for example "0", in the sequence symbol boxes 290A, 290B, 290C, 290D, 290E as a special symbol or signal to cause playing of the item or stop or pause or become disabled or be skipped. A switch (not shown) may be provided to set up the numbers in the sequence symbol boxes 290A, 290B, 290C, 290D, 290E to move up or down or increase or decrease in value.

The intelligence scroll bar 292 acts just like the intelligence cursor 280 to cause digitalized item sequence prioritizing, moving, researching, touching, pressing, dragging, analyzing, recording, screen moving, or similar functions.

At the same time, the arrow scroll device and press key 296/298 can also be used as music or movie play keys or multimedia play keys such as a record arrow button, a go back to the end button, a go backward or reverse button, a stop button, a go forward button, a go forward to the end button, a pause button, a save button for file or group saving, a delete button for file or group deleting, or similar function keys.

For example, when a user selects Song A 268A from the content of Album A 258A, the intelligence scroll bar 292 stays or highlights on Song A. Under this end-using condition, the user can use the scroll arrow/press unit 296/298 for multimedia playing functions. The press device 298 may become a play button. Alternatively, there may be a switch (not shown) to select the scroll/press unit 296/298 to go into a multimedia play mode. Under that mode, the right or left arrows of the arrow device 296 may become a go forward or backward button, the up arrow of the arrow device 296 may become a stop/pause button, the down arrow of the arrow device 296 may become a continue play button, and the press device 298 may become a play button, etc. The arrangements of arrow plus button combination and/or association may vary in design, style, shape, location and method of operation.

The intelligence scroll function bar 292 can work on the butterfly display style, left side display style, right side display style, or any other suitable display style.

The location on the screen, the shape, the design, the arrangement, and the method of operation of the intelligence scroll bar 292 may vary.

The location, size, design, arrangement, and method of operation of scroll/press device 296/298 may also vary. Scroll/press device 296/298 can also be replaced by any kind of input device, such as a dial wheel, a push button, a joystick, a touch panel, a keypad, a node-stick, a button-stick or similar form of input device.

Although several embodiments of the present invention have been shown and described, it is to be understood that many changes and modifications may be made thereunto, without departing from the spirit and scope of the invention as defined in the appended claims.

What is claimed is:

1. A system for facilitating selection of at least one media item from a plurality of media items comprising:
   (a) an input unit comprising a housing, a sphere or a scroll arrow device disposed in the housing, a display device in a front portion of the housing and an intelligence scroll sequence function bar for causing computer programmed screen scroll moving or screen scrolling functions in response to movements of the intelligence scroll sequence function bar,
   said movements being controlled by an input device,
   said intelligence scroll sequence function bar being adapted to detect a user selectable command or content item on the display device,
   said intelligence scroll sequence function bar being operable to organize media items associated with the user selectable item into a selected operation sequence based on a number of times the intelligence scroll sequence function bar senses and generates a click signal on a sequence symbol associated with a respective media item when the user selectable item is a content item,
   said intelligence scroll sequence function bar being operable to carry out computer programmed functions associated with the user selectable item when the user selectable item is a command item;
   (b) a source unit accessible by the input unit for storage of media items;
   (c) a central processing unit for operating and processing computerized programs comprising input commands of a user through the display device to display computerized results to the user;
   (d) a play unit comprising at least one media item, said play unit causing operation of the at least one media item in response to commands received from the input unit; and
   (e) an output unit for causing display of results of commands or contents of media items on the display device.

2. The system according to claim 1, wherein the input device comprises an input device selected from the group consisting of a dial wheel, a push button, a joystick, a touch panel, a keypad, a node-stick and a button-stick.

3. The system according to claim 2, wherein the input device comprises a touch panel.

4. The system according to claim 1, wherein said intelligence scroll sequence function bar has a background simultaneously organized sequence function for adjusting a priority level of a media item upwardly or downwardly by placing the intelligence scroll sequence function bar on the media item of the plurality of media items and clicking on the media item a number of times corresponding to a desired priority level, wherein the priority level of the media item can be adjusted using the intelligence scroll sequence function bar simultaneously while at least one of the media item and another media item of the plurality of media items is being operated by the play unit.

5. A system for facilitating selection of at least one media item from a plurality of media items comprising:
   (a) an input unit comprising a housing, a sphere or a scroll arrow device disposed in the housing, and a display device in a front portion of the housing, said display device comprising
   a bordered screen comprising a plurality of borders and an intelligence cursor or scroll bar responsive to movements of the sphere or the scroll arrow device for generating a signal to activate a computer programmed screen or scroll moving function or a computer programmed cursor movement function for generating cursor motions in "X" axis and "Y" axis directions,
   said intelligence cursor or scroll bar being adapted to detect a user selectable command or content item on the display device,
   said intelligence cursor or scroll bar being operable to organize media items associated with the user selectable item into a selected operation sequence based on a number of times the intelligence cursor or scroll bar senses and generates a click signal on a sequence symbol associated with a respective media item when the user selectable item is a content item,
   said intelligence cursor or scroll bar being operable to carry out computer programmed functions associated with the user selectable item when the user selectable item is a command item;
   (b) a source unit accessible by the input unit for storage of media items;
   (c) a central processing unit for operating and processing computerized programs comprising input commands of a user through the display device to display computerized results to the user;
   (d) a play unit comprising at least one media item, said play unit causing operation of the at least one media item in response to commands received from the input unit; and
   (e) an output unit for causing display of results of commands or contents of media items on the display device.

6. The system according to claim 5 wherein movement of the intelligence cursor or scroll bar into contact with a border generates a border moving signal for causing movement of the border and change in data displayed within the bordered screen from a first data set to a second data set.

7. The system according to claim 5 wherein the bordered screen comprises at least two sub-screens with different screen contents.

8. The system according to claim 5 wherein the bordered screen comprises a list of user selectable items, wherein contact by the intelligence cursor or scroll bar with a user selectable item causes display of an associated pop-up butterfly wing style display comprising a sub-list of user selectable items.

9. The system according to claim 5, wherein said intelligence cursor or scroll bar has a background simultaneously organized sequence function for adjusting a priority level of a media item upwardly or downwardly by placing the intelligence cursor or scroll bar on the media item of the plurality of media items and clicking on the media item a number of times corresponding to a desired priority level, wherein the priority level of the media item can be adjusted using the intelligence cursor or scroll bar simultaneously while at least one of the media item and another media item of the plurality of media items is being operated by the play unit.

10. A method of facilitating selection of at least one media item from a plurality of media items stored in a source unit for operation by a portable media player in response to signals generated by an input device comprising the steps of:
  (a) generating a multimedia play menu for display on a screen of the portable media player, the menu comprising a list of media items to be operated by the portable media player, each media item having an associated sequence symbol,
  (b) providing the portable media player with an intelligence scroll sequence function bar and an input device,
  (c) controlling movements of the intelligence scroll sequence function bar with the input device,
  (d) controlling a computer programmed press command function of the intelligence scroll sequence function bar with the input device,
  (e) activating at least one of a computer programmed screen scroll moving function and a computer programmed screen scrolling function of the intelligence scroll sequence function bar in response to movements of the intelligence scroll sequence function bar, and
  (f) changing a priority operation sequence associated with a media item relative to other media items in the list of media items by applying the intelligence scroll sequence function bar to a sequence symbol associated with the media item.

11. The method of claim 10 wherein the input device is programmed to cause activation of a recording function, a go back to a front end of a media item function, a reverse function, a stop function, a forward function, a go forward to a rear end of a media item function, a pause function, a save function for saving a file or a group into the storage unit, and a delete function for deleting a file or a group from the storage unit.

12. The method of claim 11, further comprising the step of using the input device as at least one of a music play key, a movie play key and multimedia play key.

13. The method of claim 10, wherein the input device comprises an input device selected from the group consisting of a dial wheel, a push button, a joystick, a touch panel, a keypad, a node-stick and a button-stick.

14. The method of claim 13, wherein the input device comprises a touch panel.

15. The method of claim 10, further comprising the step of generating an auto playgroup organizer system from the multimedia play menu using a background simultaneously organized sequence function of the intelligence scroll sequence function bar by placing the intelligence scroll sequence function bar on a media item of the plurality of media items and clicking on the media item to adjust a priority level of the media item upwardly or downwardly, wherein the priority level of the media item can be adjusted using the intelligence scroll sequence function bar simultaneously while at least one of the media item and another media item of the plurality of media items is being operated by the portable media player.

* * * * *